United States Patent
Monnin et al.

(10) Patent No.: US 10,225,695 B2
(45) Date of Patent: *Mar. 5, 2019

(54) SMART PLAYABLE DEVICE AND CHARGING SYSTEMS AND METHODS

(71) Applicant: Play Impossible Corporation, Seattle, WA (US)

(72) Inventors: Brian Monnin, Seattle, WA (US); Gadi Amit, San Mateo, CA (US); Kevin Langdon, Lewisburg, PA (US)

(73) Assignee: Play Impossible Corporation, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,569

(22) Filed: Dec. 14, 2017

(65) Prior Publication Data
US 2018/0176361 A1    Jun. 21, 2018

Related U.S. Application Data

(63) Continuation of application No. 15/296,961, filed on Oct. 18, 2016, now Pat. No. 9,876,889.
(Continued)

(51) Int. Cl.
*H04M 1/725*    (2006.01)
*H04W 4/02*     (2018.01)
(Continued)

(52) U.S. Cl.
CPC .......... *H04W 4/027* (2013.01); *A63F 13/211* (2014.09); *A63F 13/235* (2014.09); *A63F 13/25* (2014.09);
(Continued)

(58) Field of Classification Search
None
See application file for complete search history.

(56) References Cited

U.S. PATENT DOCUMENTS 5,447,314 A * 9/1995 Yamazaki .......... A63B 24/0021
                                                    473/353
5,820,484 A    10/1998 Terry
(Continued)

FOREIGN PATENT DOCUMENTS

WO    WO2015130773    9/2015

OTHER PUBLICATIONS

"94Fifty Smart Sensor Basketball", retrieved on Oct. 11, 2016 at https://web.archive.org/web/20160404023006/http://www.94fifty.com/learn-more/, 8 pgs.
(Continued)

*Primary Examiner* — David Bilodeau
(74) *Attorney, Agent, or Firm* — Lee & Hayes, P.C.

(57) ABSTRACT

This disclosure is generally directed to a smart playable device and charging systems and methods. The playable device can include any device that is suitable for sports, games, or play, such as balls, discs, staffs, clubs, and the like. The playable device can include rapid charging circuits to receive power from a remote charger. The playable device may transmit sensor data including motion data to a computing device. Sensor data may be interpreted by the computing device as gestures of the playable device for interacting with the computing device. Sensor data can also be interpreted as motion data during gameplay and notifications can be provided to a user based on the gameplay. In some instances, the computing device can capture image data of the playable device and identify the playable device and annotate image data based on the sensor data from the playable device.

14 Claims, 23 Drawing Sheets

Related U.S. Application Data

(60) Provisional application No. 62/361,936, filed on Jul. 13, 2016.

(51) Int. Cl.

| | | |
|---|---|---|
| *H04W 4/70* | (2018.01) | |
| *H01Q 1/24* | (2006.01) | |
| *H01Q 1/38* | (2006.01) | |
| *A63F 13/211* | (2014.01) | |
| *A63F 13/235* | (2014.01) | |
| *A63F 13/25* | (2014.01) | |
| *A63F 13/42* | (2014.01) | |
| *A63F 13/533* | (2014.01) | |
| *A63F 13/79* | (2014.01) | |
| *H04W 76/14* | (2018.01) | |
| *G06F 3/01* | (2006.01) | |
| *G06F 3/0346* | (2013.01) | |
| *H02J 7/00* | (2006.01) | |
| *H04L 29/08* | (2006.01) | |
| *A63F 13/92* | (2014.01) | |
| *H04W 4/029* | (2018.01) | |
| *G06T 7/20* | (2017.01) | |
| *G06T 7/40* | (2017.01) | |
| *G06T 7/60* | (2017.01) | |
| *G06T 11/00* | (2006.01) | |
| *H01Q 1/22* | (2006.01) | |
| *H01Q 1/27* | (2006.01) | |
| *G06F 3/038* | (2013.01) | |
| *G06T 7/62* | (2017.01) | |
| *G06T 7/90* | (2017.01) | |
| *G06F 3/0482* | (2013.01) | |
| *G06T 13/80* | (2011.01) | |

(52) U.S. Cl.
CPC ............ *A63F 13/42* (2014.09); *A63F 13/533* (2014.09); *A63F 13/79* (2014.09); *A63F 13/92* (2014.09); *G06F 3/017* (2013.01); *G06F 3/038* (2013.01); *G06F 3/0346* (2013.01); *G06T 7/20* (2013.01); *G06T 7/408* (2013.01); *G06T 7/602* (2013.01); *G06T 7/62* (2017.01); *G06T 7/90* (2017.01); *G06T 11/001* (2013.01); *H01Q 1/22* (2013.01); *H01Q 1/24* (2013.01); *H01Q 1/243* (2013.01); *H01Q 1/27* (2013.01); *H01Q 1/38* (2013.01); *H02J 7/0047* (2013.01); *H04L 67/306* (2013.01); *H04M 1/72522* (2013.01); *H04M 1/72527* (2013.01); *H04W 4/029* (2018.02); *H04W 4/70* (2018.02); *H04W 76/14* (2018.02); *A63F 2300/105* (2013.01); *G06F 3/0482* (2013.01); *G06T 13/80* (2013.01); *G06T 2207/30241* (2013.01); *H04M 1/7253* (2013.01); *H04M 2250/52* (2013.01)

(56) References Cited

U.S. PATENT DOCUMENTS

| | | | |
|---|---|---|---|
| 7,796,155 B1 | 9/2010 | Neely, III et al. | |
| 8,517,870 B2 | 8/2013 | Crowley et al. | |
| 8,870,690 B2 | 10/2014 | Krysiak et al. | |
| 9,241,635 B2 | 1/2016 | Yuen et al. | |
| 2006/0189386 A1 | 8/2006 | Rosenberg | |
| 2006/0279039 A1 | 12/2006 | Krieger et al. | |
| 2007/0032318 A1* | 2/2007 | Nishimura | A63B 24/0021 473/570 |
| 2007/0178967 A1 | 8/2007 | Rosenberg | |
| 2010/0045243 A1 | 2/2010 | Mizuno et al. | |
| 2010/0227705 A1 | 9/2010 | Huang | |
| 2011/0065305 A1 | 3/2011 | Amit et al. | |
| 2012/0052971 A1 | 3/2012 | Bentley | |
| 2012/0212505 A1 | 8/2012 | Burroughs et al. | |
| 2013/0274040 A1 | 10/2013 | Coza et al. | |
| 2013/0274635 A1 | 10/2013 | Coza et al. | |
| 2013/0274904 A1 | 10/2013 | Coza et al. | |
| 2014/0120960 A1 | 5/2014 | Hohteri | |
| 2014/0195019 A1 | 7/2014 | Thurman et al. | |
| 2014/0195022 A1 | 7/2014 | Thurman et al. | |
| 2014/0200103 A1 | 7/2014 | Thurman et al. | |
| 2014/0290360 A1 | 10/2014 | Binder | |
| 2014/0298212 A1 | 10/2014 | Wen | |
| 2015/0019135 A1 | 1/2015 | Kacyvenski et al. | |
| 2015/0105173 A1 | 4/2015 | Thurman et al. | |
| 2015/0328516 A1 | 11/2015 | Coza et al. | |
| 2015/0340904 A1 | 11/2015 | Munson et al. | |
| 2015/0358440 A1 | 12/2015 | Vossoughi et al. | |
| 2016/0027325 A1 | 1/2016 | Malhotra | |
| 2016/0074714 A1 | 3/2016 | Krysiak et al. | |
| 2016/0107046 A1 | 4/2016 | Krysiak et al. | |
| 2017/0072283 A1 | 3/2017 | Davisson et al. | |
| 2018/0015363 A1 | 1/2018 | Monnin et al. | |
| 2018/0020089 A1 | 1/2018 | Monnin et al. | |
| 2018/0020328 A1 | 1/2018 | Monnin et al. | |
| 2018/0117436 A1 | 5/2018 | Coza et al. | |

OTHER PUBLICATIONS

"Adidas Micoach Smart Ball" retrieved on Oct. 11, 2016 at http://www.adidas.com/us/micoach-smart-ball/G83963.html, 4 pgs.

"Introducing Wilson X", retrieved on Oct. 11, 2016 at http://www.wilson.com/en-us/explore/basketball/wx.html, 6 pgs.

Kickstarter, "Hackaball—A Computer you can Throw by Hackaball", retrieved on Oct. 11, 2016 at http://www.kickstarter.com/projects/hackaball/hackaball-a-programmable-ball-for-active-and-creat/description, 25 pgs.

Office Action for U.S. Appl. 15/297,015, dated Jan. 10, 2018, Brian Monnin,"Capturing Smart Playable Device and Gestures", 16 pages.

PCT Search Report and Written Opinion dated Oct. 19, 2017 for PCT Application No. PCT/US17/39387, 16 pages.

PCT Search Report and Written Opinion dated Oct. 26, 2017 for PCT Application No. PCT/US17/39391, 15 pages.

The PCT Search Report and Written Opinion dated Oct. 27, 2017 for PCT application No. PCT/US2017-039394, 13 pages.

"ShotTracker, The Wearable Tech that Automatically Tracks Shot Attempts, Makes and Misses",retrieved on Oct. 11, 2016 at http://shottracker.com; 11 pgs.

Office Action for U.S. Appl. 15/296,996, dated Jun. 13, 2018, Monnin, "Smart Playable Device, Gestures, and User Interfaces", 16 pages.

* cited by examiner

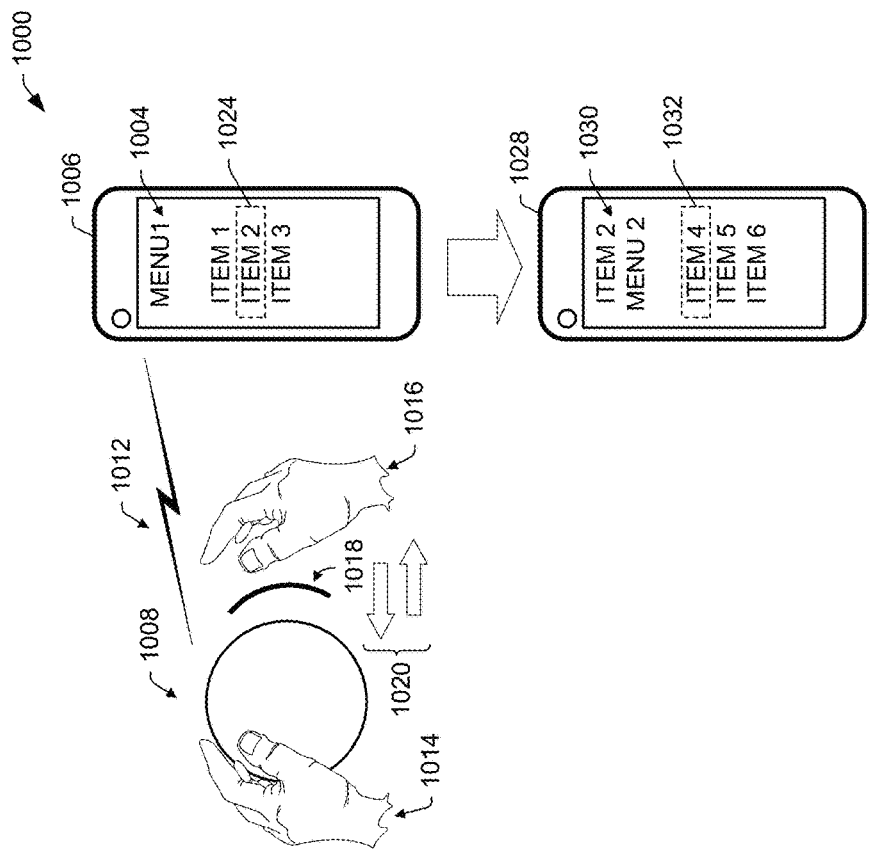
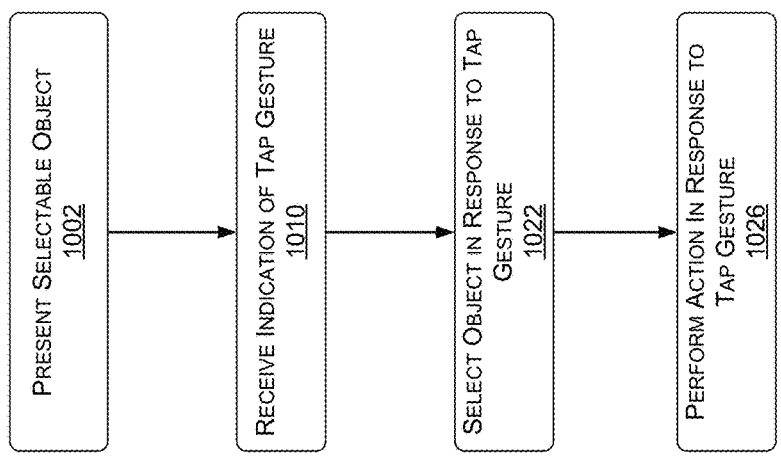
FIG. 10

SMART PLAYABLE DEVICE AND CHARGING SYSTEMS AND METHODS

CROSS REFERENCE TO RELATED APPLICATIONS

This is a continuation application which claims priority to commonly assigned, co-pending U.S. patent application Ser. No. 15/296,961, filed Oct. 18, 2016, which claims priority filing benefit from U.S. Provisional Patent Application No. 62/361,936, filed Jul. 13, 2016. Application Ser. No. 15/296,961 and 62/361,936 are fully incorporated herein by reference.

BACKGROUND

Sports, games, and play continue to serve as a source of entertainment for children and adults alike. Such activity provides sociological, psychological, and physiological benefits, and improves health and happiness. However, as electronic devices become more prevalent in modern society, time allocated to sports, games, and play is frequently replaced with sedentary activity, including time spent interacting with electronic devices.

Early attempts at adding electronics to sports equipment, such as a basketball, has resulted in devices capable of logging a limited subset of events associated with the basketball, such as dribbling or shooting. However, such sports equipment suffers from poor hardware and software interfaces that have not fully bridged the gap between electronic devices and sports, games, and play.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 10 illustrates a pictorial flow diagram of a process for interacting with a computing device via a tap gesture associated with a playable device.

DETAILED DESCRIPTION

Figure 1:
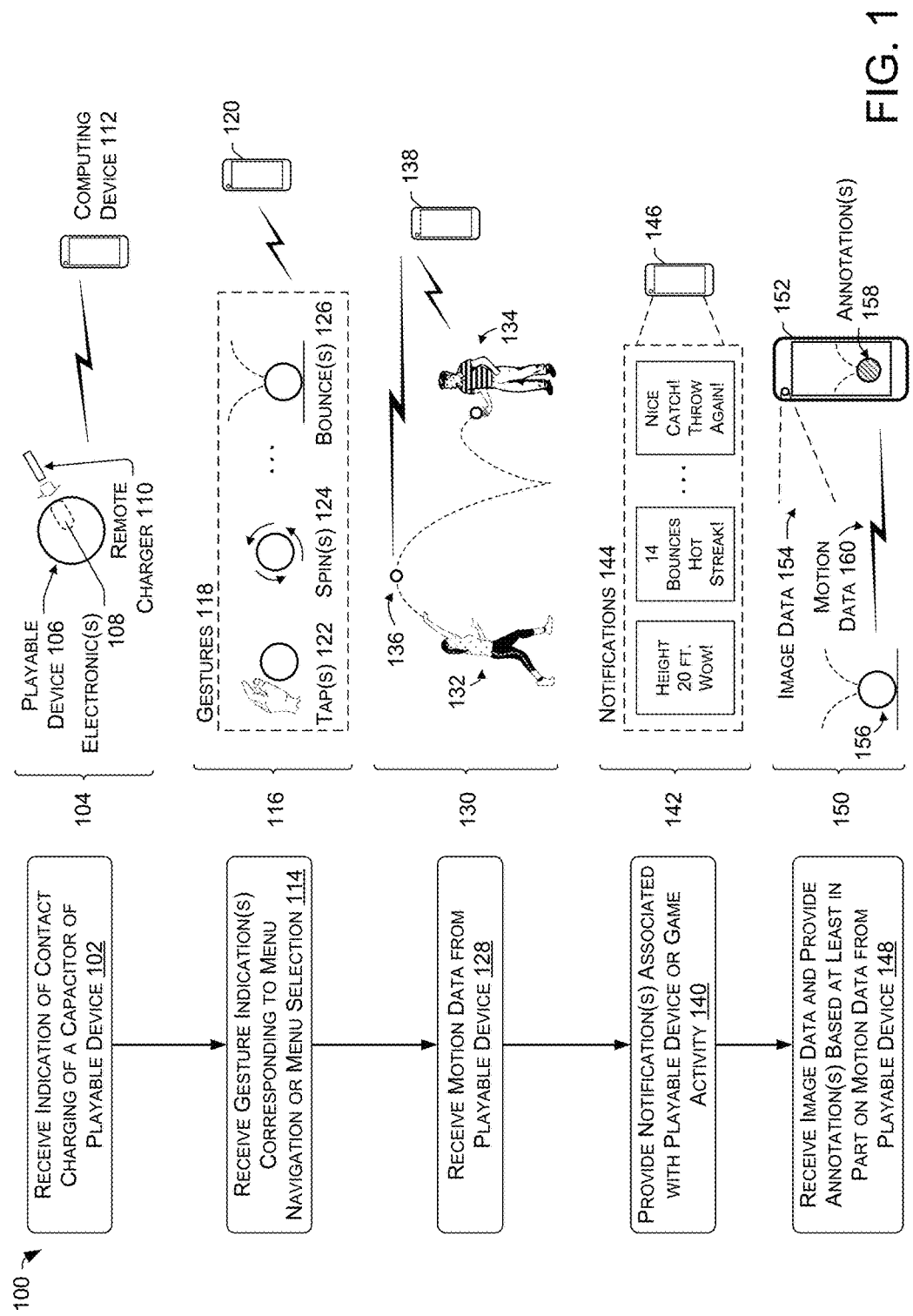
FIG. 1 illustrates a pictorial flow diagram of a process for charging and interacting with a playable device in communication with a computing device.

This disclosure is generally directed to a smart playable device and systems and methods of interacting with the playable device. More particularly, this disclosure is directed to a playable device, rapid charging of the playable device, gestures for utilizing the playable device to interact with a computing device, and various interfaces, including providing notifications based on motion data and capturing imaging data of the playable device.

A playable device can include any device that is suitable for sports, games, and play, including but not limited to balls, discs, sticks, staffs, clubs, etc. For example, playable devices may include balls or objects directed to sports such as baseball, basketball, soccer, football (American football), rugby, cricket, tennis, golf, hockey, etc. In some instances, a playable device may include a flying disc, a staff, or a cylinder, for example, for throwing. In some instances, a playable device may include equipment associated with a particular sport or game, such as a baseball bat, golf clubs, a tennis racket, etc.

In some instances, the playable device can include an electronics assembly for generating motion data associated with the playable device and transmitting the motion data to a computing device. In a case where the playable device is a ball, the playable device may include various layers of the ball (e.g., an exterior layer, an interior layer, an air bladder, etc.), with the electronics assembly mounted within the ball. In some instances, the electronics assembly may be mounted at one or more points in the ball, such as an interior wall of the ball. The electronics assembly may include one or more components installed on a circuit board, such as a printed circuit board. In one particular implementation, the electronics assembly may generate motion data via one or more sensors, such as one or more accelerometers (e.g., to determine centripetal acceleration and/or angular velocity) and a barometer (e.g., to determine height). In some instances, the electronics assembly may include two accelerometers installed at opposite ends of the circuit board for accurate motion detection. The electronics assembly may include wireless capabilities to communicate with a computing device. Additional sensors may include, but are not limited to, one or more gyroscopes, GPS (global positioning system) receivers, a single accelerometer, multiple accelerometers mounted on a single plane or multiple planes of the electronics assembly, pressure sensors, temperature sensors, humidity sensors, pH sensors, microphones, magnetic sensors, capacitive sensors, imaging sensors, etc. Further, the playable device may include a speaker and/or a microphone to generate and/or receive ultrasonic sounds to further identify a location and/or velocity of the playable device using frequency and/or phase measurement techniques, such as determining a Doppler shift of the sound.

The electronics assembly may include various power supplies or energy modules to power the electronics assembly. In some instances, an energy module may include one or more batteries, capacitors, supercapacitors, ultracapacitors, fuel cells, electrochemical power supplies, springs, flywheels, solar cells, solar panels, etc. In some instances, the electronics assembly may include one power source, such as a supercapacitor or an ultracapacitor, without other sources of power, such as a battery or a rechargeable battery, and vice versa. In some instances, the energy module may include energy harvesters that generate power from radio waves, such as from Wi-Fi or other wireless signals. Further, the energy module may include one or more voltage regulators, such as an input voltage regulator and/or an output voltage regulator. The electronics assembly may include one or more connectors configured to receive power from an external power source, such as via an external battery or via power provided from a utility. For example, a connector may include a contact-type connector that maintains a connection via external pressure, or a connector that includes a latching-type connector that maintains a connection via a latch or locking mechanism (e.g., via mechanical or magnetic operations), or friction via a male/female-type connectors. In some instances, wireless charging, such as induction charging, may be used to provide energy to the playable device.

To initiate charging, a remote power supply (e.g., including a battery supply) may be contacted to the playable device and pressure may be applied to maintain contact with the playable device. The remote power supply (e.g., a remote charger) may supply power to the playable device, which may be stored in a supercapacitor installed in the electronics assembly. A voltage of the supercapacitor may be monitored by a processor of the playable device and transmitted wirelessly to a computing device that is associated with the playable device. In response, the computing device may display an indication of the power level of the playable device, such as a percentage of capacity (e.g. 50%, 75%, 99%, 100%, etc.).

As mentioned above, the playable device may wirelessly communicate with a computing device to control operations of the computing device and/or to provide motion data of the playable device to the computing device. For example, a user may perform one or more gestures with the playable device to initiate a connection with a computing device, navigate menus, and/or perform selections to initiate gameplay. For example gestures of the playable device may include, but are not limited to, one or more of taps (e.g., single tap or double tap), spins (e.g., free spin or controlled spin), bounces, throws, shakes, squeezes, etc. In some instances, the gestures associated with a playable device may be based on a type of the playable device and/or may be associated with a particular user profile. In some instances, a computing device may learn gestures and associate gestures with a particular user profile. In some instances, users and/or game developers may define gestures and/or define actions to be performed in response to one or more gestures, or sequences of gestures.

The playable device may transmit motion data (or other data associated with the playable device) to the computing device for tracking motion of the playable device and/or for providing notifications and/or indications to a user to improve interactivity of the playable device and computing device system. For example, for a game where an object of the game is not to allow the playable device to touch the ground, the playable device may transmit motion data to the computing device to determine that the playable device has not touched the ground (e.g., while being passed from player to player) or has touched the ground (e.g., after being dropped by a player). Upon receiving motion data that the playable device has touched the ground, such as via a barometer and one or more accelerometers associated with the playable device, the computing device may provide audio, visual, and/or haptic indications in furtherance of the gameplay.

Motion data from the playable device may be further utilized by a computing device to identify and/or track the playable device in image data received by the computing device. For example, the computing device may include an image sensor that can generate pictures and/or video that may include the playable device. The computing device may perform image analysis on the image data to identify the playable device (e.g., via a known shape and/or color), and may utilize the motion data from the playable device to increase an accuracy of the image analysis and/or may annotate the audio and/or video associated with the playable device with effects. For example, continuing with the example above involving a game where an object of the game is not to allow the playable device to touch the ground, a computing device capturing image data of gameplay of the playable device may provide annotations based on the motion data, such as a crashing noise or visual effect (such as an overlaid animation) when the playable device touches the ground. By way of another example, an annotation may include tracing a path of the playable device within the imaging data and/or annotating the imaging data with a color associated with the motion data (e.g., colors based on speed, spin rate, height, number of bounces, gravitational forces (e.g., g-forces) experienced by the playable device, etc.).

The techniques and systems described herein may be implemented in a number of ways. Example implementations are provided below with reference to the following figures.

FIG. 1 illustrates a pictorial flow diagram of a process 100 for charging and interacting with a playable device in communication with a computing device. FIG. 1 illustrates a high-level pictorial flow diagram, and additional details of the implementation are given throughout this disclosure.

At 102, the operation can include receiving an indication of contact charging of a capacitor of the playable device. In an example 104, a playable device 106 is represented as a ball including electronic(s) 108. A remote charger 110 may be contacted to the electronics 108 of the playable device 106 which may provide power to the playable device 106. The operation 102 may include establishing communications between the playable device 106 and a computing device 112, and the playable device 106 may transmit a charging indication to the computing device 112. In some instances, the charging indication may include one or more measurements or indications of a voltage or power level of the playable device 106, such as a capacity percentage of an energy module of the electronics 108. For example, the computing device 112 may receive an indication that charging is "50% complete" or "55% complete" and may provide one or more indications of the charging status via a display of the computing device 112.

At 114, the operation can include receiving one or more gesture indications corresponding to a menu navigation and/or a menu selection. In an example 116, gestures 118 are performed via the playable device 106, for example, and indications of the gestures (e.g., sensor data or motion data) can be transmitted to a computing device 120 for interpretation by the computing device 120. As mentioned above, the gesture indications can be interpreted by the computing device 120 to navigate one or more menus presented via the computing device 120 or to select one or more items from a menu presented via the computing device 120. In some instances, a gesture indication can initiate a connection between the playable device (e.g., the playable device 106) and the computing device 120. For example, following a charging of the playable device (e.g., in the operation 102), a user can perform one of the gestures 118, and, in response, the playable device 106 can provide a gesture indication to the computing device 120. For example, the gestures may include, but are not limited to, tap(s) 122, spin(s) 124, bounce(s) 126, etc. The gestures 118 may further include, but are not limited to, shake(s), throw(s), squeeze(s), etc. The gesture indications may be received as motion data by the computing device 120 and interpreted as the gestures 118 to allow a user to interact with the computing device 120.

At 128, the operation can include receiving motion data from the playable device. In an example 130, users 132 and 134 are playing with a playable device 136. As the playable device 136 is thrown by the user 132 and follows the path illustrated as a dotted line in the example 130, the playable device 136 measures motion data and transmits the motion data to a computing device 138. For example, one or more accelerometers in the playable device 136 can measure acceleration that can be used to derive centripetal acceleration and/or spin. Further, a barometer in the playable device 136 can be used to measure a height of the playable device 136. Motion data can be transmitted continuously and wirelessly (e.g., via Bluetooth or Bluetooth low energy) to the computing device 138 during gameplay. In some cases, the motion data can be transmitted on scheduled intervals (e.g., every millisecond), and in some cases, motion data can be transmitted in response to detected motion. In some cases, motion data can be batched in memory at the playable device 136 and transmitted in regular intervals (e.g., every 10 milliseconds) or upon request from the computing device 138, or some other trigger. In some case, the motion data can be interpreted by the computing device 138 to determine speed, height, spin, gestures, etc. of the playable device 136.

At 140, the operation can include providing one or more notifications associated with the playable device or game activity. In an example 142, notifications 144 are illustrated as being displayed by a computing device 146. For example the notifications 144 include messages such as "Height 20 ft. Wow!", "14 Bounces Hot Streak!", or "Nice Catch! Throw Again!". As may be understood in the context of this disclosure, the notifications 144 are not limited to the examples shown in FIG. 1 and may include a variety of notification. In some instances, the notifications may include visual, audio, and/or haptic notifications corresponding to game activity, and/or may be based on or associated with rules of a particular game. For example, in a game directed to catching a ball softly, an audio notification of "You're out!" may be provided upon detecting that an acceleration of the ball was above a threshold while catching the ball.

By way of another example, for a game where an object of the game is not to allow the playable device to touch the ground, notifications (such as the notifications 144) may include counting a number of passes of the playable device between players, playable device metrics (e.g., height, speed, spin, time in the air, etc.) during gameplay, occasions where a high score is met or exceeded, instructions to alter gameplay, and/or a concluding notification when the playable device touches the ground, among other possibilities.

At 148, the operation can include receiving image data and providing annotations based at least in part on motion data from the playable device. In an example 150, a computing device 152 may receive and/or capture image data 154 via one or more imaging devices of the computing device 152. For example, the image data 154 may include image data associated with a playable device 156 in a field of view of the computing device 152. In some instances, annotation(s) 158 can include visual, audio, and/or haptic effects added by the computing device in real time (e.g., as augmented reality) or can include visual, audio, and/or haptic effects added by the computing device 152 following recordation of the image data 154. That is, the operation 148 may include video editing operations to designate a portion of image data as subject image data and apply one or more annotations to the data, for subsequent distribution and/or playback. In some instances, the computing device 152 can designate a portion of image data as the subject image data based upon determining a game event (e.g., success, failure, high scores, scoring a point, etc.).

The computing device 152 may receive image data 154 and motion data 160 corresponding to the playable device 156 and utilize the motion data 160 to identify the playable device 156 in the image data 154. Further, using the motion data 160 of the playable device 156, the computing device 152 may extrapolate a current position of the playable device 156 to an expected location of the playable device 156 at a later time to determine if the computing device 152 should be moved or adjusted to maintain the playable device 156 in a frame of the computing device 152. In some instances, the annotation 158 can include an indication to move the computing device up, down, left, right, or a combination thereof, to maintain the playable device 156 in a frame of the computing device 152. In some instances, the computing device 152 may perform an action to maintain the playable device 156 in a frame of the computing device 152, such as by decreasing a zoom associated with image data 154 to increase a size of a field of view, for example.

As mentioned above, the annotations 158 can include visual and/or audio effects associated with motion data 160 of the playable device 156. For example, the annotations 158 can include colors superimposed over a path of the playable device and/or over the playable device 156 to indicate relative speeds, heights, spins, etc. In some instances, annotations 158 can correspond to game activity, such as starting or finishing a game, completing a game task, failing a game task, etc. In some instances, the annotations 158 can correspond to high scores or historical motion data. For example, the annotations 158 may indicate when the playable device 156 is thrown above a previous maximum-thrown height. In some instances, the annotations 158 may be based on a profile of a user or one of a plurality of selectable themes associated with various games or gameplay.

Figure 2:
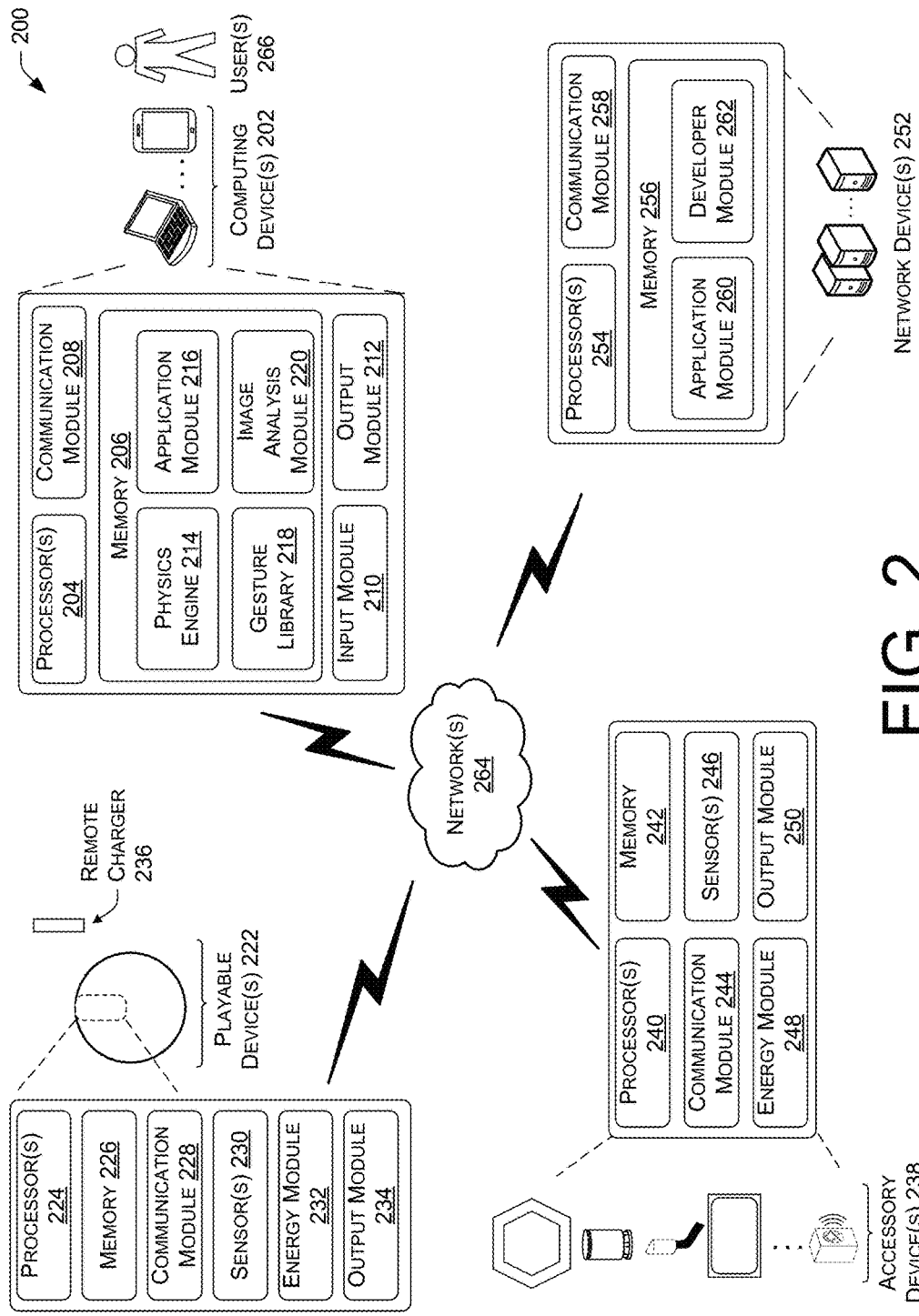
FIG. 2 illustrates an example environment including the playable device, the computing device, and various accessory devices and network devices.

FIG. 2 illustrates an example environment 200 including the playable device, the computing device, and various accessory devices and network devices. The environment 200 includes computing device(s) 202 having processor(s) 204, a memory 206, and various modules such as a communication module 208, an input module 210, and an output module 212. Further, the memory 206 can include a physics engine 214, an application module 216, a gesture library 218, and an image analysis module 220. In some instances, the computing device(s) 202 (also referred to as a computing device 202) can perform the operations described in connection with FIG. 1.

The environment 200 also includes playable device(s) 222 having processor(s) 224, a memory 226, a communication module 228, sensor(s) 230, an energy module 232, and an output module 234. The playable device(s) 222 (also referred to as a playable device 222) may utilize a remote charger 236 to supply power to the playable device 222.

The environment 200 also includes accessory device(s) 238 having processor(s) 240, a memory 242, a communication module 244, sensor(s) 246, an energy module 248, and an output module 250. In general, the accessory device(s) 238 (also referred to as an accessory device 238) may include one or more devices including sensors to provide additional motion data and/or location data associated with the playable device 222 and/or may include further input or output devices (e.g., a display, an imaging device, a microphone, haptic feedback device, etc.) to improve interactivity with the playable device 222.

Further, the environment 200 may include network device(s) 252 having processor(s) 254, a memory 256, and a communication module 258. In some instances, the memory 256 may include an application module 260 and a developer module 262. Further, features described in connection with the network device(s) 252 (also referred to as a network device 252) can be performed by the computing device 202, and features described in connection with the computing device 202 can be performed by the network device 252. In some embodiments, features can be distributed between the computing device 202 and the network device 252, with requests and responses provided between the devices to perform the operations described herein.

The computing device(s) 202, the playable device(s) 222, the accessory device(s) 238, and the network device(s) 252 may communicate via one or more network(s) 264. In some instances, the network(s) 264 (also referred to as a network 264) can represent one or more wired or wireless networks, such as the Internet, a Mobile Telephone Network (MTN), or other various communication technologies. In some instances, the network 264 can include any WAN or LAN communicating via one or more wireless protocols including but not limited to RFID, near-field communications, optical (IR) communication, Bluetooth, Bluetooth low energy, Zig-Bee, Z-Wave, Thread, LTE, LTE-Advanced, WiFi, WiFi-Direct, LoRa, Homeplug, MoCA, Ethernet, etc. In some instances, the network 264 may include one or more mesh networks including the playable device(s) 222, the computing device(s) 202, and/or the accessory device(s) 238.

The environment 200 also includes one or more user(s) 266 to employ the computing device 202. The one or more user(s) 266 (also referred to as a user 266) can interact with the computing devices 202 (and/or the playable device(s) 222, the remote charger 236, the accessory device(s) 238, and/or the network device(s) 252) to perform a variety of operations discussed herein. Indeed, an object of the present disclosure is for users 266 to interact with the playable device 222 and the computing device 202 to play and have fun.

As introduced above, the computing device(s) 202 can include, but are not limited to, any one of a variety of computing devices, such as a smart phone, a mobile phone, a personal digital assistant (PDA), an electronic book device, a laptop computer, a desktop computer, a tablet computer, a portable computer, a gaming device, a personal media player device, a server computer, a wearable device, or any other electronic device.

Further, the computing device(s) 202 can include the processor(s) 204 and the memory 206. The processor(s) 204 can be a single processing unit or a number of units, each of which could include multiple different processing units. The processor(s) 204 can include one or more microprocessors, microcomputers, microcontrollers, digital signal processors, central processing units (CPUs), graphics processing units (GPUs), security processors (e.g., secure cryptoprocessors), and/or other processors. Alternatively, or in addition, some or all of the techniques described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), state machines, Complex Programmable Logic Devices (CPLDs), other logic circuitry, systems on chips (SoCs), and/or any other devices that perform operations based on software and/or hardware coded instructions. Among other capabilities, the processor(s) 204 can be configured to fetch and/or execute computer-readable instructions stored in the memory 206. In some instances, the processors 224, 240, and/or 254 may include similar hardware and/or software as the processor(s) 204.

The memory 206 can include one or a combination of computer-readable media. As used herein, "computer-readable media" includes computer storage media and communication media. In some instances, the memory 226, 242, and/or 256 may include similar hardware and/or software as the memory 206.

Computer storage media includes volatile and non-volatile, removable and non-removable media implemented in any method or technology for storage of information, such as computer-readable instructions, data structures, program modules, or other data. Computer storage media includes, but is not limited to, Phase Change Memory (PCM), Static Random-Access Memory (SRAM), Dynamic Random-Access Memory (DRAM), other types of Random-Access Memory (RAM), Read-Only Memory (ROM), Electrically Erasable Programmable ROM (EEPROM), flash memory or other memory technology, Compact Disc ROM (CD-ROM), Digital Versatile Discs (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The communication module 208 may include functionality to receive wired or wireless data from the network 264 and/or from one or more of the playable device(s) 222, the accessory device(s) 238, the network device(s) 252, and/or additional computing devices. In some instances, the communication module 208 can receive data in accordance with one or more transmission protocols, such as HTTP, HTTPS, Bluetooth, Bluetooth low energy, Wi-Fi, etc. In some instances, the communication module 208 may monitor a strength of a wireless signal associated with the playable device 222 and/or the accessory device 238 in conjunction with other data to determine a location of the playable device (e.g., using a received signal strength indicator (RSSI) or a received signal power).

The input module 210 may include various input devices including an imaging device, one or more microphones, a touch display, one or more proximity sensors, etc. In some instances, the input module 210 may further include sensors such as one or more accelerometers, gyroscopes, barometers, temperature sensors, GPS sensors, light sensors, etc.

The output module 212 may include one or more output devices generating audible output (e.g., via a speaker), visual output (e.g., via a display), and/or haptic feedback (e.g., vibration motors).

As mentioned above, the memory 206 of the computing device 202 may include the physics engine 214, the application module 216, the gesture library 218, and the image analysis module 220. In general, the computing device 202 may include functionality to receive data associated with the playable device 222 to determine a motion and/or location of the playable device 222 to provide notifications and/or annotations to enhance gameplay.

The physics engine 214 can include functionality to receive motion data and/or location data associated with the playable device 222 to determine physical movements and/or operations associated with the playable device 222. In some instances, the physics engine 214 can receive data from the playable device 222 and/or the accessory device(s) 238 to determine motion and/or location of the playable device 222. For example, the physics engine 214 may receive data from one or more accelerometers associated with the playable device 222 to determine and/or detect one or more throws, spins, catches, bounces, velocity, height, air time, etc. associated with the playable device 222. For example, the physics engine 214 may receive as input one or more of accelerometer information or barometer information from the playable device 222. As may be understood in the context of this disclosure, information received by the physics engine 214 may depend on a number and type of sensors available in the playable device 222.

In some instances, the physics engine 214 can determine a throw by detecting a free fall of the playable device 222 that exceeds a time threshold, such as 250 milliseconds. In some instances, a free fall may be represented as an acceleration of an accelerometer in the playable device 222 approaching an acceleration of zero. In contrast, in some cases, for a stationary playable device 222, a total magnitude of the acceleration of an accelerometer may be equal to approximately 9.8 meters per second squared ($m/s^2$). In some instances, the physics engine 214 can determine centripetal acceleration (and/or centripetal forces) and drag forces and/or can separate the centripetal forces from drag forces utilizing acceleration measures from two or more locations on the playable device 222 to more accurately determine free fall. In some instances, the physics engine 214 can determine a lift force and/or side force generated by rotation of the playable device 222, such as a Magnus force, to more accurately determine velocity and/or free fall of the playable device 222.

Further, the physics engine 214 may include functionality to identify a particular type of playable device 222 connected to the computing device 202 and to associate a particular physics engine profile with the playable device 222. For example, the physics engine 214 may include various information about the playable device 222, such as physical dimensions (e.g., length, width, height, diameter, location of center of mass, etc.), mass, maximum throw speed, maximum spin rate, maximum spin height, maximum throw time, drag coefficient, etc.

In some instances, the physics engine 214 can include functionality to determine an acceleration of a center of mass of the playable device 222. In some instances, the center mass acceleration ($a_{cm}$) of the playable device 222 may be based in part on a centripetal acceleration of two or more accelerometers located in the playable device 222. For example, the playable device 222 may include two accelerometers mounted on a printed circuit board. Thus, an acceleration of the center of mass of the playable device 222 can be determined by the physics engine 214 based on the following equation:

$$a_{cm} = \frac{a_{r1} - k a_{r2}}{1 - k} \tag{1}$$

Further, an acceleration ($a_r$) of an accelerometer at a radius (r) may be determined by the physics engine 214 based on the angular velocity (w) as:

$$a_r = r w^2 \tag{2}$$

In equation (1) above, the acceleration of the center of mass ($a_{cm}$) of the playable device 222 may be based at least in part on a first acceleration ($a_{r1}$) of a first accelerometer at a first radius $r_1$ from the center of mass, and a second acceleration ($a_{r2}$) of a second accelerometer at a second radius $r_2$ from the center of mass. A weighting factor (k) can be included to compensate for variations in accelerometer locations within the playable device 222. In some instances, the weighting factor k can be stored in the physics engine 214 and may be based on a type of the playable device 222.

In some instances, error may be introduced based on a radius of the accelerometer from a center of mass ($r_1$) and a difference of that radius to an actual radius of the accelerometer from the center of mass ($\Delta r_1$). In some cases, a first order calculation of error, given a change in $r_1$ ($\Delta r_1$) can be determined as:

$$\Delta a_{cm} = -\frac{r_1 w^2}{r_1 - r_2} \Delta r_1 \tag{3}$$

As mentioned above, the playable device 222 may include two accelerometers mounted on a printed circuit board. In some instances, an error in $r_1$ may correspond to an error in $r_2$ (because a placement of components on the printed circuit board is relatively accurate, e.g., on the order of 100 μm). In this case, an error in acceleration can be determined based on a radius of the center of the accelerometers to the center of mass ($r_{cm}$) of the playable device 222 as:

$$\Delta a_{cm} = w^2 r_{cm} \qquad (4)$$

In some instances, the physics engine 214 can determine a catch of the playable device 222 and a bounce of the playable device 222, and may distinguish between a catch and a bounce. For example, a bounce can be determined by the physics engine 214 when the playable device 222 returns to free fall within a threshold amount of time (e.g., 200 milliseconds) of previously being in free fall. In some instances, if the playable device 222 does not return to free fall within the threshold amount of time, the physics engine 214 may determine the playable device 222 has been caught. In some instances, the physics engine 214 can differentiate between different types of catches (e.g., hard, soft, etc.) based on a deceleration of the playable device 222.

In some instances, the physics engine 214 can receive one or more instantaneous accelerations values from the playable device 222, and in some instances, the physics engine 214 may receive an indication from the playable device 222 that the playable device 222 is in free fall or not in free fall, and can determine a catch or bounce based on that indication. That is, the playable device 222 can provide a binary indication to the physics engine 214 whether the playable device 222 is in free fall or not. In some instances, the physics engine 214 may receive acceleration data from the playable device 222 and determine whether the playable device 222 is in free fall or not.

In some instances, the physics engine 214 can determine a velocity of the playable device 222 based on an accumulation of accelerometer data from the playable device 222 immediately prior to free fall of the playable device 222. In some instances, a throwing motion can be determined based at least in part on accelerometer values of the playable device 222 within a threshold amount of time prior to free fall of the playable device 222. The threshold amount of time, or in some cases, a window of time prior to the playable device 222 entering free fall (also referred to as a "throw window") can be dynamically determined based on accelerometer values from the playable device 222.

For example, a start of the window of time can be determined to correspond to a time in which an acceleration of the playable device is within a threshold amount to the acceleration of gravity (e.g., +/−10%, +/−5%, etc. of gravitational acceleration) for a threshold amount of time (e.g., 40 milliseconds). Further, in some instances, accelerometer data of the playable device 222 at the start of the window can be used to determine an orientation of the playable device 222 and/or a direction of gravity on the playable device 222. Further, determining a throw velocity can include removing an acceleration due to gravity from each acceleration within the throw window. That is, the physics engine 214 can compensate for acceleration due to gravity to determine a velocity of the playable device 222 during a throw window, for example.

In some instances, the physics engine 214 can determine a centripetal force associated with the playable device 222 based on angular velocity of the playable device 222, and in some instances, the centripetal force can be removed from the acceleration data of the playable device 222.

In some instances, the physics engine 214 of can determine a drag of the playable device 222 based at least in part on an instantaneous velocity of the playable device 222, and in some instances, the physics engine 214 can utilize drag to determine a velocity of the playable device 222 throughout a throw, for example. Further, the physics engine 214 can use the aforementioned accelerations, velocities, forces, and drags to determine a location of a playable device 222 or distance traveled by the playable device 222 during a throw, for example, from a first user to a second user.

In some instances, the physics engine 214 can determine a throw height of the playable device 222 based at least in part on barometer data from the playable device 222 during a throw. In some instances, the physics engine 214 can increase an accuracy of determining a throw height by using GPS data, weather data, and/or pressure data to determine pressure at a location associated with the playable device 222. In some instances, the physics engine 214 can include a filter, such as a Kalman filter, to reduce an amount of noise present in values received by a barometer of the playable device 222.

In some instances, the physics engine 214 can determine air time of the playable device 222 corresponding to an amount of time the playable device 222 is in the air, for example, during a throw. In some instances, the air time can be determined based on an amount of time between when a throw is detected and when a bounce or catch is determined.

As discussed above, the physics engine 214 may receive sensor data from any number of sensors associated with the playable device 222. For example, the physics engine 214 may incorporate gyroscope sensor data to increase an accuracy of acceleration, velocity, and or location of the playable device 222.

The physics engine 214 may receive additional data to approximate and/or confirm an acceleration, speed, and/or location of the playable device 222. For example, the playable physics engine 214 may receive a received signal strength indication (RSSI) associated with the playable device 222 and determine a change over time to determine an acceleration, speed, and/or location of the playable device. In some instances, the physics engine 214 may receive audio data to determine sound-based localization of the playable device 222. For example, a microphone array of the computing device 202 or the accessory device 238 may determine a direction of the playable device 222 (in a case where the playable device 222 emits a noise, for example, a high-frequency localization audio indication).

The application module 216 can include data and/or rules associated with one or more games or applications to be used in conjunction with the playable device 222. For instance, the application module 216 may include menus, player data, high scores, rules, notifications, annotations, etc. associated with the various games or applications of the computing device 202. In some instances, the application module 216 may include one or more user profiles associated with the user 266, for example, or one or more user profiles associated with various players of games of the application module 216. In some instances, the application module 216 can store rules associated with gameplay and/or notifications to present to the user 266 in response to receiving motion data corresponding to motion of the playable device 222. Additional aspects of the application module 216 are described in connection with the various figures of the disclosure.

The gesture library 218 can operate in conjunction with the physics engine 214 to determine one or more gestures of the playable device 222. In some instances, the gesture library 218 can determine one or more gestures of the playable device 222 in response to the application module 216 entering a navigation mode (e.g., menu navigation), for example, of a game. The gesture library 218 may include various sequences of parameters (e.g., accelerations, acceleration thresholds, time thresholds, bounce detection, throw detection, pressure thresholds, etc.) that when detected may indicate a gesture performed by the playable device 222. Additional aspects of the gesture library 218 are described in connection with the various figures of the disclosure.

In one particular implementation, the gesture library 218 may include functionality to calibrate the playable device 222 or learn sensor data of the playable device 222 when instructing the user 266 to perform one or more gestures. For example, the computing device 202 may instruct the user 266 to perform a particular gesture, and the computing device may receive the sensor data and interpret the sensor data as the particular gesture. In some instances, learning or calibration may be associated with a user profile, in connection with one or more gesture preferences.

The image analysis module 220 can include functionality to receive image data and to identify and/or annotate image data based on motion data and gameplay of the playable device 222, for example. In some instances, the image analysis module 220 may receive image data from an image sensor of the computing device 202 and may perform image analysis to identify the playable device 222 in a frame of image data. For example, the image analysis module 220 may include size data, shape data, color data, etc. associated with the playable device 222 to identify the playable device 222 in image data. In some instances, the image analysis module 220 may receive motion data from the physics engine 214, for example, to increase a confidence level or accuracy of identifying the playable device 222. In one example, the image analysis module 220 may utilized motion data to extrapolate a position of the playable device 222 within a frame of the computing device 202 and provide an indication to adjust the computing device to maintain the playable device 222 in frame. In some instances, the image analysis module 220 may receive RSSI data and/or audio localization data associated with the playable device 222 to further enhance an accuracy of identification and/or annotations, as discussed herein.

In some instances, the image analysis module 220 may include functionality to annotate image data based at least in part on gameplay and/or based at least in part on motion data of the playable device 222. For example, the image analysis module 220 may trace a path of the playable device 222 on a display of the computing device 202 and colorized the path according to a relative speed of the playable device 222. In one example, the image analysis module 220 may overlay an animation over image data based on gameplay, for example, when a player has complete a task (e.g., an animation representing trumpet horns blaring with confetti) or when a player has failed a task (e.g., an animation representing a display screen of the computing device 202 cracking, shattering, or breaking, or an animation representing the playable device exploding or shattering on impact). In some instances, a path of the playable device 222 may be colorized based on a height of the playable device 222, a spin, an acceleration, etc.

In some instances, the image analysis module 220 may include functionality to identify relevant sections of image data for subsequent playback or editing. For example, upon detecting a gameplay event (e.g., winning or losing a game, scoring a point, surpassing historical sensor data, etc.) the image analysis module 220 may flag, tag, or otherwise preserve image data within a window of the gameplay event for subsequent review. In some instances, the image analysis module 220 may identify gameplay events based on audio commands spoken by a user (e.g., "Watch me!", "Start recording", etc.). In some instances, the image analysis module 220 may identify a gameplay event based on ambient noise levels or based on identifying cheering or laughing, for example. In this manner, the image analysis module 220 may identify and preserve image data likely to be relevant for subsequent review.

In some instances, the image analysis module 220 may include functionality to edit image data, such as cropping, changing start times or stop times, adding slow motion, changing image attributes such as colors, brightness, etc. In some instances, a user may distribute image data (e.g., images or video) of gameplay following editing by the image analysis module 220. In some instances, distribution may include, but is not limited to text message, email, social networking, uploading data to an application or website, etc.

Turning to the playable device 222, in general, the playable device 222 may include any device suitable for engaging in sports, games, and/or play. As discussed above, the playable device(s) 222 may include balls or objects directed to (or similar to those directed to) sports such as baseball, basketball, soccer, football (American football), rugby, cricket, tennis, golf, hockey, etc. In some instances, a playable device 222 may include a flying disc, a staff, or a cylinder, for example, for throwing. In some instances, a playable device 222 may include equipment associated with a particular sport or game, such as a baseball bat, golf clubs, a tennis racket, etc.

As discussed above, the playable device 222 may include the processor(s) 224 and the memory 226 that can include similar hardware and/or software as those described herein with respect to the processor(s) 204 and the memory 206, and vice versa. Further, the playable device 222 can include a communication module 228 that may include hardware and/or software as described herein with respect to the communication module 208. For example, the communication module 228 may include any hardware and/or software suitable for communicating with one or more other playable device(s) 222, one or more accessory device(s) 238, one or more computing device(s) 202, and one or more network device(s) 252. In some instances, the communication module 228 may include a transmitter/receiver for communication via one or more protocols described above with respect to the network 264.

The sensor(s) 230 can include one or more sensors for generating motion data and/or location data associated with the playable device 222. For example, the sensor(s) 230 may include one or more accelerometers, barometers, gyroscopes, internal pressure sensor (e.g., measuring a pressure of an air bladder associated with a playable device 222), external pressure sensor (e.g., measuring atmospheric pressure), magnetometers, capacitive sensors, etc. In some instances, the accelerometers may include 2-axis accelerometers, and in some instances, the accelerometers may include 3-axis accelerometers. In some instances, the sensor(s) 230 may include two accelerometers and a barometer mounted on a printed circuit board. In some instances, the sensor(s) 230 may include audio and/or image sensors. In some instances, one or more sensors may be omitted to reduce energy consumption, weight, volume, etc.

The energy module 232 can include one or more power storage devices to provide power to the playable device 222. For example, the energy module 232 may include one or more batteries, capacitors, supercapacitors, ultracapacitors, fuel cells, electrochemical power supplies, springs, flywheels, etc. In some instances, the energy module 232 may include a single source of energy, for example, a supercapacitor or ultracapacitor, without additional sources of energy, such as a battery and/or a rechargeable battery, and vice versa. In some instances, the energy module 232 may include energy harvesters that generate power from radio waves, such as from Wi-Fi or other wireless signals. Further, the energy module 232 may include one or more voltage regulators, such as an input voltage regulator and/or an output voltage regulator. In some instances, the energy module 232 may include or more power inputs, such as contact connectors, latch connectors, or wireless connectors (e.g., for inductive charging).

The output module 234 can include one or more lights, displays, speakers, and/or haptic outputs. For example, the output module 234 may provide feedback to the user 266 that the playable device 222 is operating normally or that the playable device 222 is in an abnormal state. In some instances, the output provided by the output module 234 may be detectable by the user 266. For example, the output module 234 may include one or more passive outputs, such as a magnet, to be detected by a corresponding sensor on the accessory device(s) 238 and/or on the computing device 202. In some instances, the output module 234 may be configured to generate an audio signal that is outside the human hearing range (e.g., above 20 kHz) to provide an audio signal that can be detected by another device. In some instances, a light output by the output 234 may be in an IR (infrared) range or UV (ultraviolet) range, although in some cases, light output by the output module 234 may be in the visible range. In some instances, the output module 234 may include one or more vibration motors to provide haptic feedback to the user 266. In some instances, the output module 234 may include a mechanism to shift the center of mass of the playable device 222 (e.g., by shifting a weight or an electronics assembly) in order to introduce random variations into the movement of the playable device 222, for example, to enhance gameplay.

The remote charger 236 can include a power supply such as one or more batteries and a connection configured to transfer energy to the energy module 232 of the playable device 222. For example, the remote charger may be a small, portable device that may provide rapid charging capabilities to the playable device 222. Upon contacting the remote charger 236 to the playable device 222, the remote charger 236 may transfer electrical energy to the playable device 222.

In general, the accessory device(s) 238 can include sensors, input devices, and/or output devices operating in conjunction with the playable device(s) 222 and/or the computing device(s) 202 to improve interaction and/or gameplay. For example, the accessory device(s) 238 may include, but are not limited to hoops, goals, nets, speakers, displays, audio input and output devices, etc.

As discussed above, the accessory device(s) 238 may include the processor(s) 240 and the memory 242 having similar hardware and/or software as those described herein with respect to the processor(s) 204 and the memory 206, and vice versa. Further, the communication module 244 of the accessory device(s) 238 may include hardware and/or software as described herein with respect to the communication modules 208 or 228.

The sensor(s) 246 can include any combination of sensors described above in connection with the sensor(s) 230. For example, if the playable device 222 includes a magnet as an output device, the accessory device 238 can include a corresponding sensor to detect the magnetic field of the playable device 222. For example, if the accessory device 238 is a hoop or goal, the sensor(s) 246 can detect motion of the playable device 222 through the hoop or goal, and may transmit an indication of the motion (or an indication of a location) to the playable device 222 and/or to the computing device 202. In some instances, the sensors(s) 246 may be configured to generate motion data that can be transmitted to the computing device 202 and interpreted as a gesture, motion, a location, or a game event.

The energy module 248 can include one or more power supplies described herein, such as battery power or a wired connection.

The output module 250 can include one or more audio, visual, or haptic outputs. In some instances, the output module 250 can operate in conjunction with the computing device 202 to provide notifications and/or feedback to the user 266 during gameplay. In some instances, the output module 250 may include hardware and/or software as described herein with respect to the output modules 212 and 234.

In general, the network device(s) 252 can perform operations to provide additional processing to one or more computing devices 202 and/or to provide software to users 266, and access to software to developers. As discussed above, the processor(s) 254 and the memory 256 of the network device(s) 252 can include similar hardware and/or software as described herein with respect to the processor(s) 204 and the memory 206, and vice versa. The communication module 258 and the application module 260 can include similar hardware and/or software as described herein with respect to the communication module 208, 228, and 244, and the application module 216, respectively.

The developer module 262 can provide an interface to third-party developers to generate games for the computing device 202 and the playable device 222. For example, one or more software developers may access the developer module 262 which may provide application program interfaces (APIs) for the developer to write an application to receive motion data and/or location data, interpret gestures, and provide notification and/or annotations to the user. For example, a developer can create a game and upload the game to the developer module 262, where the game can be tested, verified, and distributed via the application module 260 upon a determination that the game operates in accordance with design parameters. In some instances, a developer can generate or define one or more gestures and define one or more actions in response to a gesture, for implementation on the playable device 222 and/or the computing device 202.

As used herein, the term "module" is intended to represent example divisions of software and/or firmware for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions can be implemented (e.g., performed) in whole or in part by hardware logic components, such as FPGAs, ASICs, ASSPs, state machines, CPLDs, other logic circuitry, SoCs, and so on.

The network device(s) 252 can include one or more computing devices, such as one or more desktop computers, laptop computers, servers, and the like. The one or more computing devices can be configured in a cluster, data center, cloud computing environment, or a combination thereof. In one example, the one or more computing devices provide cloud computing resources, including computational resources, storage resources, and the like, that operate remotely from the computing device(s) 202.

Additional functionality of the operations and components described above with reference to FIGS. 1 and 2 is discussed with reference to various flow diagrams and examples shown throughout the disclosure.

Figure 3A:
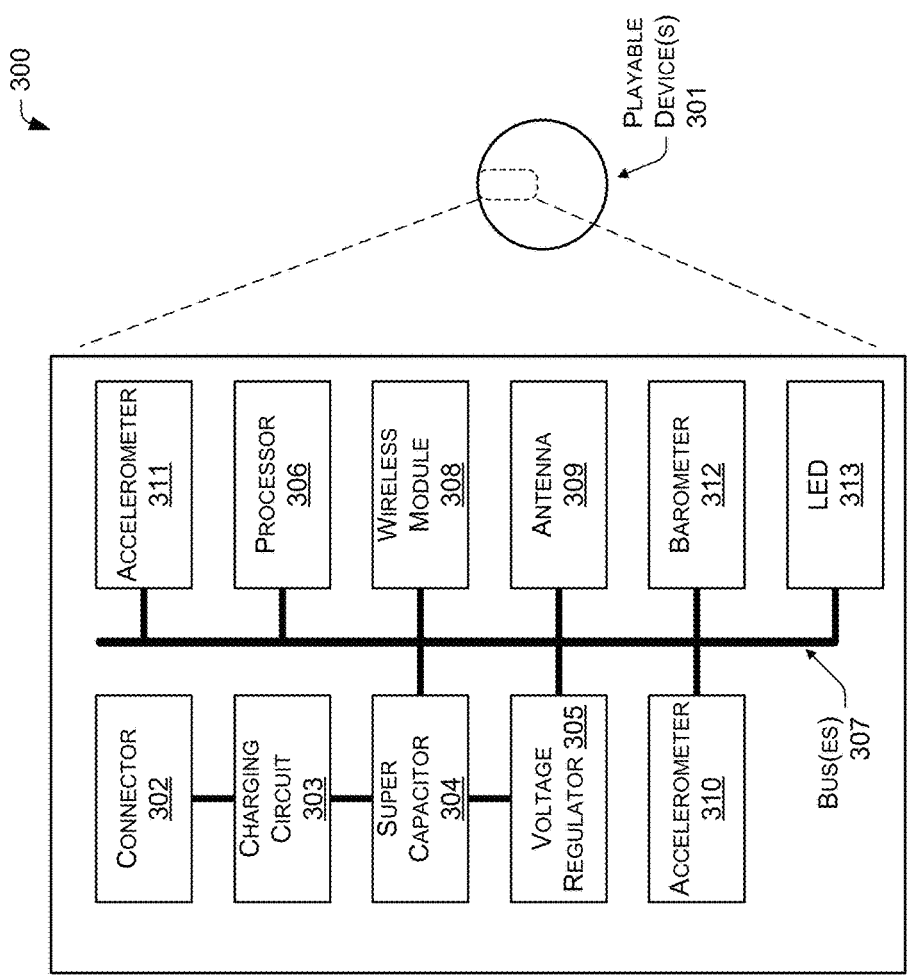
FIG. 3A shows an illustrative functional block diagram of a playable device.

FIG. 3A shows an illustrative functional block diagram 300 of a playable device. A playable device 301 may include various circuits and components to enable the playable device 301 to monitor motion of the playable device 301 and generate motion data, for example, and transmit the motion data to a computing device. The playable device 301 represents one particular implementation, and components may be added to or removed from the playable device 301 in accordance with embodiments of the disclosure.

The playable device 301 may include components and/or circuits to enable rapid charging of the playable device 301. For example, a connector 302 may allow for a remote charger (such as the remote charger 236 of FIG. 2) to be contacted to the connector 302 and provide electrical power to the playable device 301. As power is input to via the connector 302, the connector 302 may be coupled with a charging circuit 303, which may operate as an input voltage regulator to charge a supercapacitor 304. Power can be provided by the supercapacitor 304 to the voltage regulator 305 to power components of the playable device 301.

In some instances, a voltage of the supercapacitor 304 is provided to the processor 306 via the bus(es) 307, which electrically and/or operatively couples the various components of the playable device 301. In some instances, the voltage of the supercapacitor 304 can be read by an analog-to-digital converter (e.g., of the processor 306) to provide an indication of the voltage of the supercapacitor 304. In some instances, the voltage of the supercapacitor 304 is proportional to an amount of energy stored in the supercapacitor 304, such that a particular voltage of the supercapacitor 304 corresponds to a discrete power level or power capacity of the supercapacitor 304. In some instances, the processor 306 may wirelessly transmit an indication of the voltage of the supercapacitor 304 during charging via a wireless module 308 and an antenna 309.

In one particular implementation, the wireless module 308 and antenna 309 are configured to wirelessly communicate in accordance with a Bluetooth low energy protocol.

The playable device 301 may include a first accelerometer 310 and a second accelerometer 311 mounted on a printed circuit board of the playable device 301. The accelerometers 310 and 311 may be mounted at opposite ends of the printed circuit board (similar to the conceptual layout illustrated in FIG. 3A) to allow for accurate measurements of angular acceleration. In some instances, the accelerometers 310 and 311 may include 2-axis accelerometers, and in some instances, the accelerometers 310 and 311 may include 3-axis accelerometers. In some instances, the accelerometers 310 and 311 may include freefall detection and/or tap detection, such that the accelerometers 310 and 311 output a binary indication when detecting a freefall or a tap. In some instances, the playable device 301 may not include a gyroscope to save energy, for example.

The playable device 301 may further include a barometer 312 to detect a height of the playable device 301 during motion, for example, while being thrown. The barometer 312 may be normalized via weather data or pressure data received via another sensor or via the wireless module 308.

The playable device 301 may further include a LED (light emitting diode) 313 to provide a diagnostic function when determining an operating status of the playable device 301.

In some instances, the LED 313 may be located within the playable device 301 and may not be visible unless an electronics assembly of the playable device 301 is removed from an interior of the playable device 301.

Figure 3B:
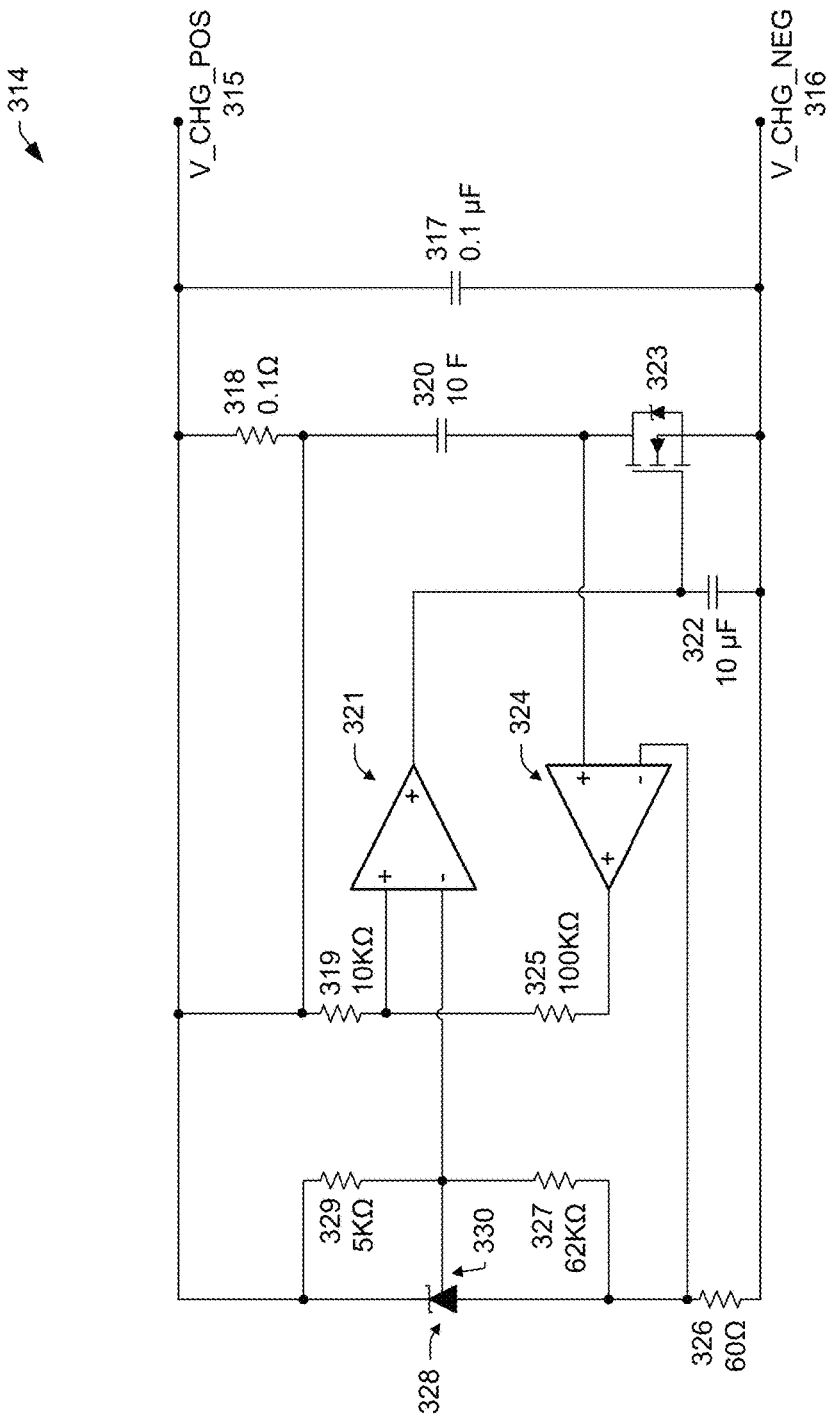
FIG. 3B shows a first illustrative charging circuit for charging a playable device.

FIG. 3B shows a first illustrative charging circuit 314 for charging a playable device 301. In some instances, the charging circuit 314 may correspond to the charging circuit 303 in FIG. 3A. In some instances, the charging circuit 314 may operate as a linear voltage regulator and may include aspects of the energy module 232.

The charging circuit 314 includes a first input 315 and a second input 316, which may correspond to positive and negative terminals of a connector supplying electrical energy to the playable device 301. The inputs 315 and 316 may be coupled by a capacitor 317 to filter transient voltages. In some instances, the capacitor 317 may be a 0.1 µF (microfarad) capacitor.

The first input 315 may be coupled to a resistor 318, which in turn may be coupled to a resistor 319 and a capacitor 320. In some instances, the capacitor 320 may be a 10 F capacitor, and may correspond to the supercapacitor 304 of FIG. 3B. The resistor 319 may be coupled to a first opamp 321 (e.g., a first operational amplifier 321). In particular, the resistor 319 may be coupled to the non-inverting input of the first opamp 321. An output of the first opamp 321 may be coupled with a capacitor 322 and a transistor 323 (and in particular, to the gate of the transistor 323). The transistor 323 may be an N-channel transistor, and a drain of the transistor 323 may be coupled to the capacitor 320, while a source of the transistor 323 may be coupled with the second input 316. Further, the drain of the transistor 323 may be coupled to a second opamp 324. In particular, the drain of the transistor 323 may be coupled with the non-inverting input of the second opamp 324. An output of the second opamp 324 may be coupled to a resistor 325, which in turn may be coupled to the resistor 319 and the non-inverting input of the first opamp 321.

The second input 316 may be further coupled with a resistor 326, which in turn may be coupled with the inverting input of the second opamp 324, a resistor 327, and an anode of a diode 328. A cathode of the diode 328 may be connected to the first input 315 and a resistor 329. An inverting input of the first opamp 321 may be coupled to the resistors 327 and 329, and may provide a reference voltage 330 to the diode 328. In some instances, the diode 328 may include the reference voltage 330 as an input to regulate an output voltage of the diode 328. In some instances, the diode 328 may be an adjustable precision shunt regulator with a reference number of AN431.

Figure 3C:
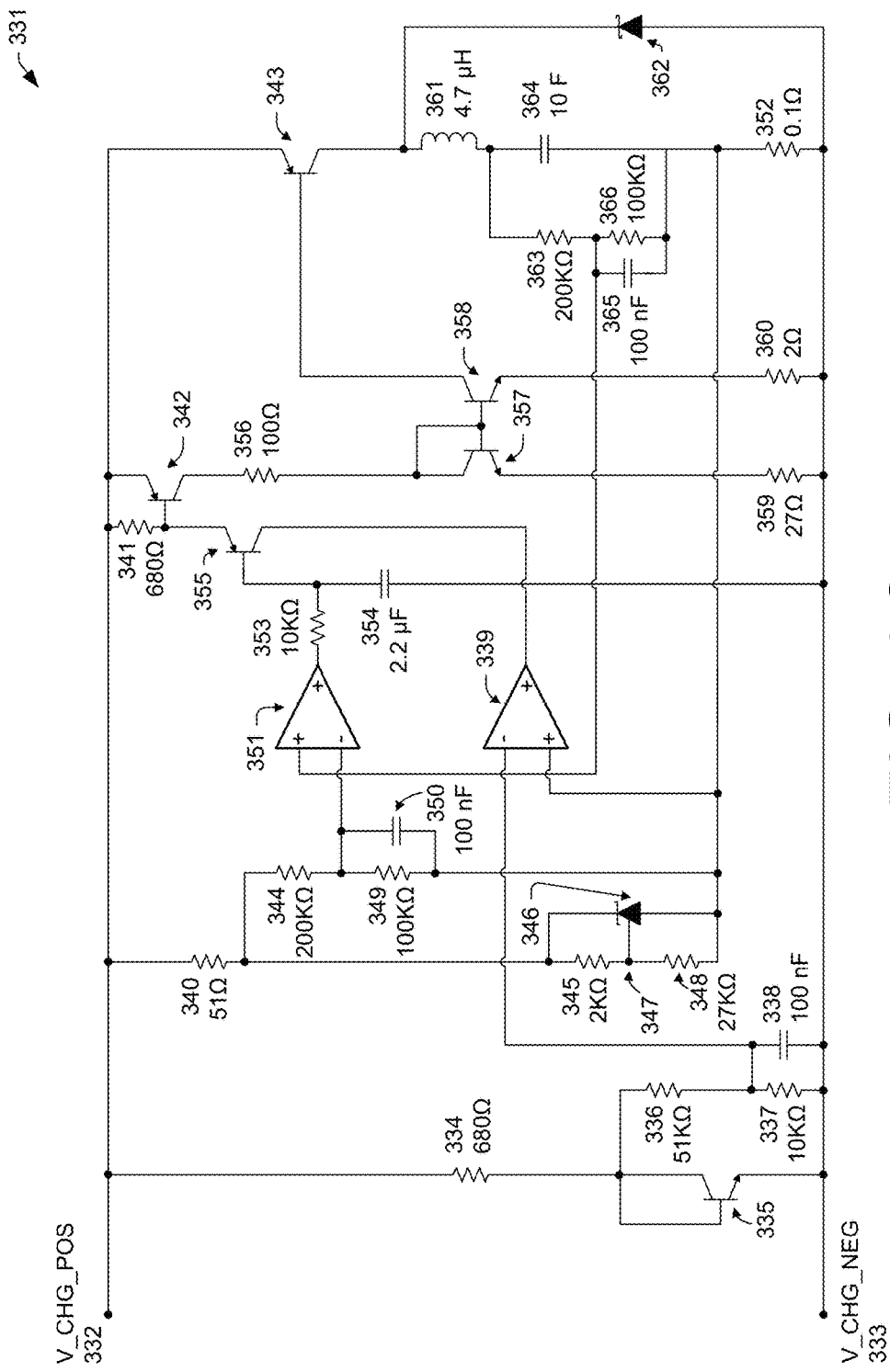
FIG. 3C shows a second illustrative charging circuit for charging a playable device.

FIG. 3C shows a second illustrative charging circuit 331 for charging a playable device. In some instances, the charging circuit 331 may correspond to the charging circuit 303 in FIG. 3A. In some instances, the charging circuit 331 may operate as a switching voltage regulator and may include aspects of the energy module 232.

The charging circuit 331 includes a first input 332 and a second input 333, which may correspond to positive and negative terminals of a connector supplying electrical energy to the playable device 301. The first input 332 may be coupled to a resistor 334, which may in turn be coupled with a transistor 335 and a resistor 336. In particular, the resistor 334 may be coupled with a collector and a gate of the transistor 335. In some instances, the transistor 335 may be a NPN bipolar junction transistor (BJT). In some instances, the emitter of the transistor 335 may be coupled with the second input 333. In some instances, the resistor 336 may be coupled with a resistor 337, a capacitor 338, and an inverting input of a first opamp 339.

The first input 332 may be further coupled to a resistor 340, a resistor 341, a transistor 342, and a transistor 343. In some instances, the transistors 342 and 343 may include PNP BJTs.

The resistor 340 may be coupled with a resistor 344, a resistor 345, and a diode 346. In particular the resistor may be coupled with a cathode of the diode 346. In some instances, the diode 346 can receive a reference voltage 347, which may regulate an output of the output voltage of the diode 346. The resistor 345 may be coupled to a resistor 348, and provides, in part, the reference voltage 347. In some instances, the diode 346 may be an adjustable precision shunt regulator with a reference number of AN431.

The resistor 344 may be coupled with a resistor 349, a capacitor 350, and an inverting input of a second opamp 351. In some instances, the opamps 339 and 351 may be included in a dual opamp package, such as one with a reference number LMV358IDT. In some instances, the dual opamp package may include polarity protection, such as via a transistor (e.g., a P-channel transistor) coupled to the first input 332 and a power supply of the dual opamp package. The resistor 349 and the capacitor 350 may be coupled with a resistor 352, which in turn, may be coupled with the second input 333.

A non-inverting output of the second opamp 351 may be coupled with a resistor 353, which may, in turn, be coupled with a capacitor 354 and a gate of a transistor 355. An emitter of the transistor 355 (e.g. a PNP BJT) may be coupled with the resistor 341 and a gate of the transistor 342. Further, a collector of the transistor 355 may be coupled with a non-inverting output of the first opamp 339. The capacitor 354 may be coupled with the second input 333.

A collector of the transistor 342 may be coupled with a resistor 356, which, in turn, may be coupled with a transistor 357 (e.g., a collector and a gate of the transistor 357). Further, the gate of the transistor 357 may be coupled with a gate of a transistor 358. Emitters of the transistors 357 and 358 may be coupled with resistors 359 and 360, respectively. The resistors 359 and 360 may in turn be coupled with the second input 333.

The transistor 343 may be coupled with an inductor 361 and a cathode of a diode 362. An anode of the diode 362 may be coupled with the second input 333.

The inductor 361 may, in turn, be coupled with a resistor 363 and a capacitor 364. In some instances, the capacitor 364 may correspond to the supercapacitor 304 of FIG. 3A.

In some instances, the resistor 363 may be coupled with a capacitor 365, a resistor 366, and a non-inverting input of the second opamp 351. As may be understood in the context of this disclosure, example values of components are provided in connection with the figures and description. Other example values may be used in accordance with the disclosure.

Figure 4A:
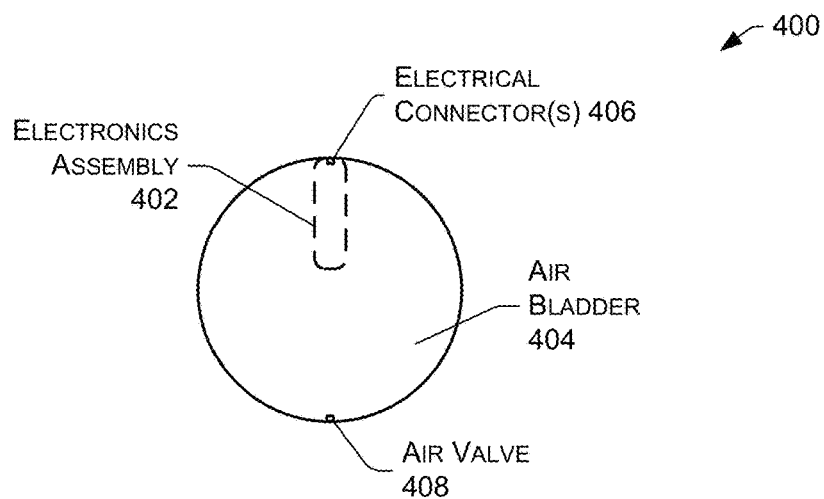
FIG. 4A shows an illustrative example of internal components of a playable device implemented as a ball.

FIG. 4A shows an illustrative example of internal components of a playable device 400 implemented as a ball. For example, the playable device 400 may include an electronics assembly 402 mounted in an interior of the playable device 400, for example, within or in contact with an air bladder 404 of the playable device 400. In some instances, the electronics assembly 402 may include one or more electrical connectors 406 providing power to the electronics assembly 402. In some instances, the electronics assembly 402 may be mounted to an internal surface of the playable device 400. In some instances, electrical connector(s) 406 are provided on an external surface of the playable device 400. Air may be provided to the air bladder 404 via an air valve 408, which may be located on a surface of the playable device 400. In some instances, the air bladder 404 is defined, in part, by the internal surface of the playable device 400 and a container including the electronics assembly 402. The air bladder 404 may include an air pressure higher than an ambient air pressure to keep a ball inflated to provide a desired bounce and/or to protect the electronics assembly 402. In some instances, the enclosure associated with the electronics assembly 402 may be at a different air pressure than the air bladder 404, which may be an ambient atmospheric air pressure that varies with height, weather, etc.

Figure 4B:
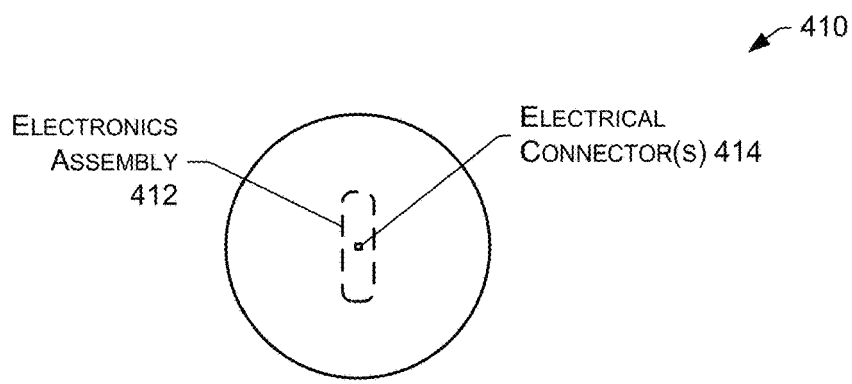
FIG. 4B shows an illustrative example of internal components of a playable device implemented as a disc.

FIG. 4B shows an illustrative example of internal components of a playable device 410 implemented as a disc. In particular, the disc may be configured to fly when thrown by a user. The playable device 410 may include an electronics assembly 412 and electrical connectors 414 for providing power to the playable device 410. In some instances, the electronics assembly 412 may be mounted at or close to a center of mass associated with the playable device 410.

Figure 4C:
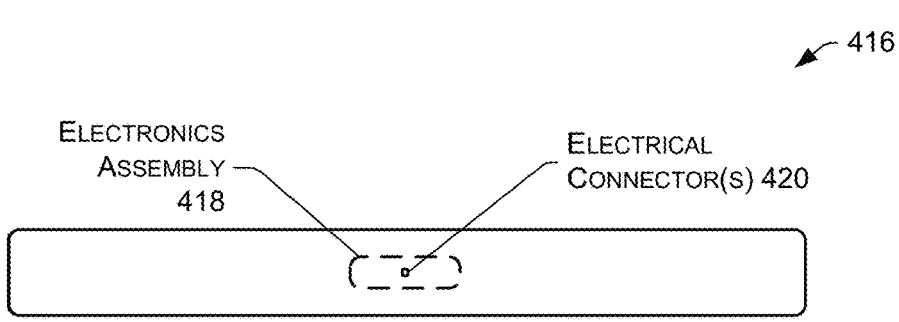
FIG. 4C shows an illustrative example of internal components of a playable device implemented as a stick or club.

FIG. 4C shows an illustrative example of internal components of a playable device 416 implemented as a stick or club. In some instances, the playable device 416 may include an electronics assembly 418 and electrical connectors 420 for providing power to the playable device 416. In some instances, the electronics assembly 418 may be mounted at or close to a center of mass associated with the playable device 416. As may be understood, the electronics assembly 402, 412, and 418 (and associated electrical connectors) may be provided in connection with any object suitable for games, sport, and play, and is not limited to the embodiments described herein.

Figure 5A:
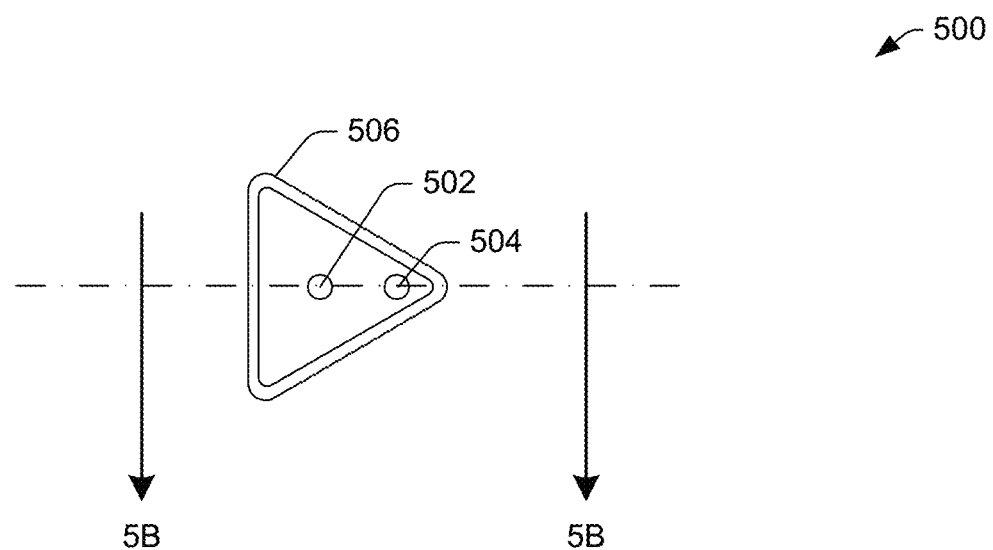
FIG. 5A shows a plan view of an exemplary power input of a playable device.

FIG. 5A shows a plan view 500 of an exemplary power input of a playable device. For example, the power input can correspond to the electrical connector(s) 406, 414, and 420 of FIGS. 4A, 4B, and 4C, respectively. In some instances, the power input may be installed on an exterior surface or external surface of a playable device to allow for a remote charger to contact the power input. The power input includes a first contact point 502 and a second contact point 504 (e.g., input contact points) that allow an electrical circuit to be made between the power input and a remote charger. In some instances, the first contact point 502 corresponds to a positive voltage input, such as the first input 315 or 332 of FIGS. 3B and 3C. In some instances, the second contact point 504 corresponds to a negative voltage input, such as the second input 316 or 333 of FIGS. 3B and 3C. As illustrated, the plan view 500 of the power input shows a border 506 of the power input. Although illustrated as a triangle with rounded corners, the shape of the border 506 may include a variety of shapes. In some instances, the shape of the border 506 can correspond to a panel of a ball, and may be aesthetically pleasing and/or may be sized to conform to an overall pattern of a playable device.

Figure 5B:
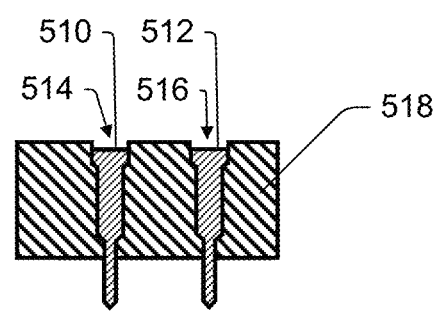
FIG. 5B shows a partial cutaway side view, taken on the line 5B-5B of FIG. 5A, of an exemplary power input of a playable device.

FIG. 5B shows a partial cutaway side view 508 of an exemplary power input that may be implemented in a variety of playable devices. In some instances, the power input illustrated in FIG. 5A corresponds to the power input illustrated in FIG. 5B. As illustrated, the power input includes a first contact point 510 and a second contact point 512 (e.g., input contact points), which may correspond to the first contact point 502 and the second contact point 504, respectively, of FIG. 5A. The first contact point 510 may be countersunk below a surface of the power input to prevent a user touching the positive terminal of the power input, illustrated by element 514. The second contact point 512 may also be countersunk below the surface of the power input, illustrated as element 516. In some instances, the depth of the first contact point 510 and the second contact 512 may be a same depth. In some instances, the depth may be different. That is, the first contact point 510 may be located at a first depth below the surface of the power input and the second contact point 512 may be located at a second depth below the surface of the power input, and in some instances, the first depth can be greater than the second depth, and vice versa. Further, the power input itself may be disposed below an external surface of the playable device, such that an area may be provided below a surface of the playable device to protect the power input. The first contact point 510 and the second contact point 512 can be mounted, embedded in, or otherwise fixed by an attachment 518. Electrical power can be provided by the first and second contact points 510 and 512 to various components of the playable device.

Figure 6B:
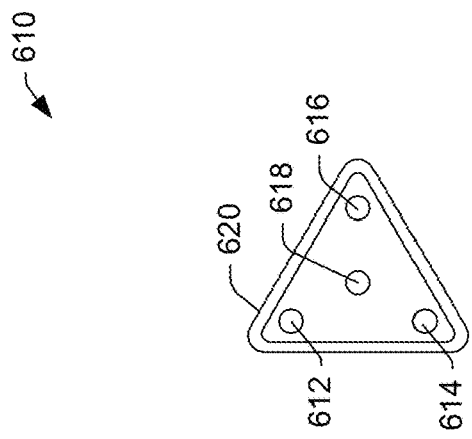
FIG. 6B illustrates a plan view of an exemplary power interface of an exemplary power supply for charging a playable device.
Figure 6A:
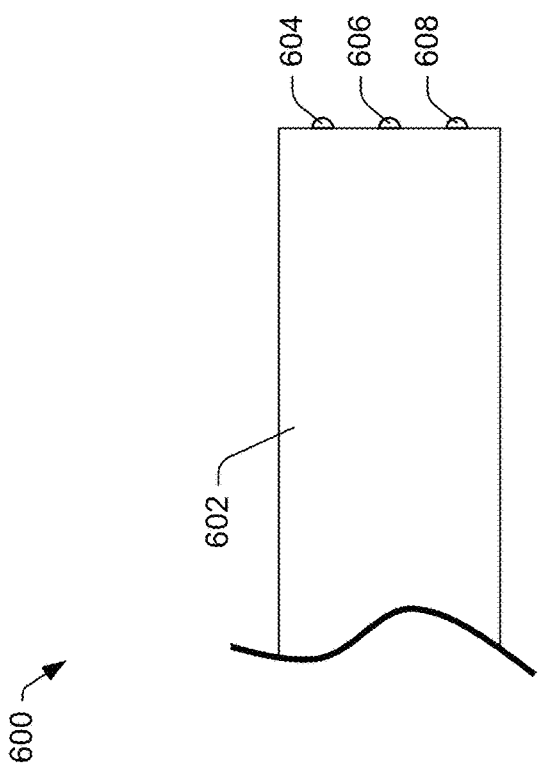
FIG. 6A illustrates a side view of an exemplary power supply for charging a playable device.

FIG. 6A illustrates a side view 600 of an exemplary power supply for charging a playable device. In some instances, the exemplary power supply corresponds to the remote charger 110 and 236 as illustrated in FIGS. 1 and 2. Further, in some instances, the power supply may include contact points (e.g., supply contact points) that correspond to the contact points of the power input (e.g., input contact points) illustrated in FIGS. 5A and 5B. The power supply may include a housing 602 having sufficient size and volume to accommodate one or more batteries, for example, to provide power to a playable device. The housing 602 may form an enclosure with a cross section having any shape, such as a circle, a triangle (e.g., as illustrated in FIG. 6B), a square, a rectangle, etc. The side view 600 illustrates contact points 604, 606, and 608 (e.g., supply contact points), which may protrude from an end of the housing 602. In some instances, the contact points 604 and 608 may be electrically connected to one another within the housing 602. That is, the contact points 604, and 608 may reflect a common connection, and therefore, may be associated with a same voltage. In some instances, the contact points 604 and 608 may comprise a negative terminal of the power supply. The contact point 606 comprise a positive terminal of the power supply. In some instances, the contact point 606 may protrude or project from a central protrusion. The contact points 604, 606, and 608 may be of sufficient height to contact to the countersunk contact points 510 and 512 of the power input, for example. As may be understood in the context of this disclosure, the interface between the contact points 606 and 510, for example, may be such that contact is maintained via external pressure between the power supply and the power input interface. That is, the connection between the contact points 606 and 510, for example, may not include a positive locking mechanism such as a latch or a magnet, or a friction connection provided by barrel connection, for example. However, this contact connection may be maintained for a brief period of time due to the rapid charging nature of the playable device, as discussed herein. In some implementations, the power supply and power input interface may include latching, locking, or frictional mechanisms to maintain a positive connection between the power supply and the power input interface absent external pressure.

FIG. 6B illustrates a plan view 610 of an exemplary power interface of an exemplary power supply for charging a playable device. In some instances, the plan view 610 corresponds to the side view 600, and the exemplary power supply of FIGS. 6B (and 6A) is configured to couple with the power input illustrated in FIGS. 5A and 5B. In some instances, FIG. 6B includes a charging surface of a remote charger (e.g., the remote charger 236) having the supply contact points mounted thereon. The power supply includes contact points 612 and 614, which may correspond to the contact points 604 and 608, respectively. The power supply may further include a contact point 616. A contact point 618 corresponds to the contact point 606, and a border 620 of the housing 602 corresponds to the profile of the border 506 in FIG. 5A. The contact points 612, 614, and 616 may be distributed symmetrically around the contact point 618.

FIGS. 1, 7, 8, 10, and 12-17 show flow diagrams that illustrative various example processes. The processes are illustrated as a collection of blocks in a logical flow graph, which represent a sequence of operations that can be implemented in hardware, software, or a combination thereof. In some instances, the collection of blocks is organized under respective entities that may perform the various operations described in the blocks. In the context of software, the blocks represent computer-executable instructions stored on one or more computer storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 7:
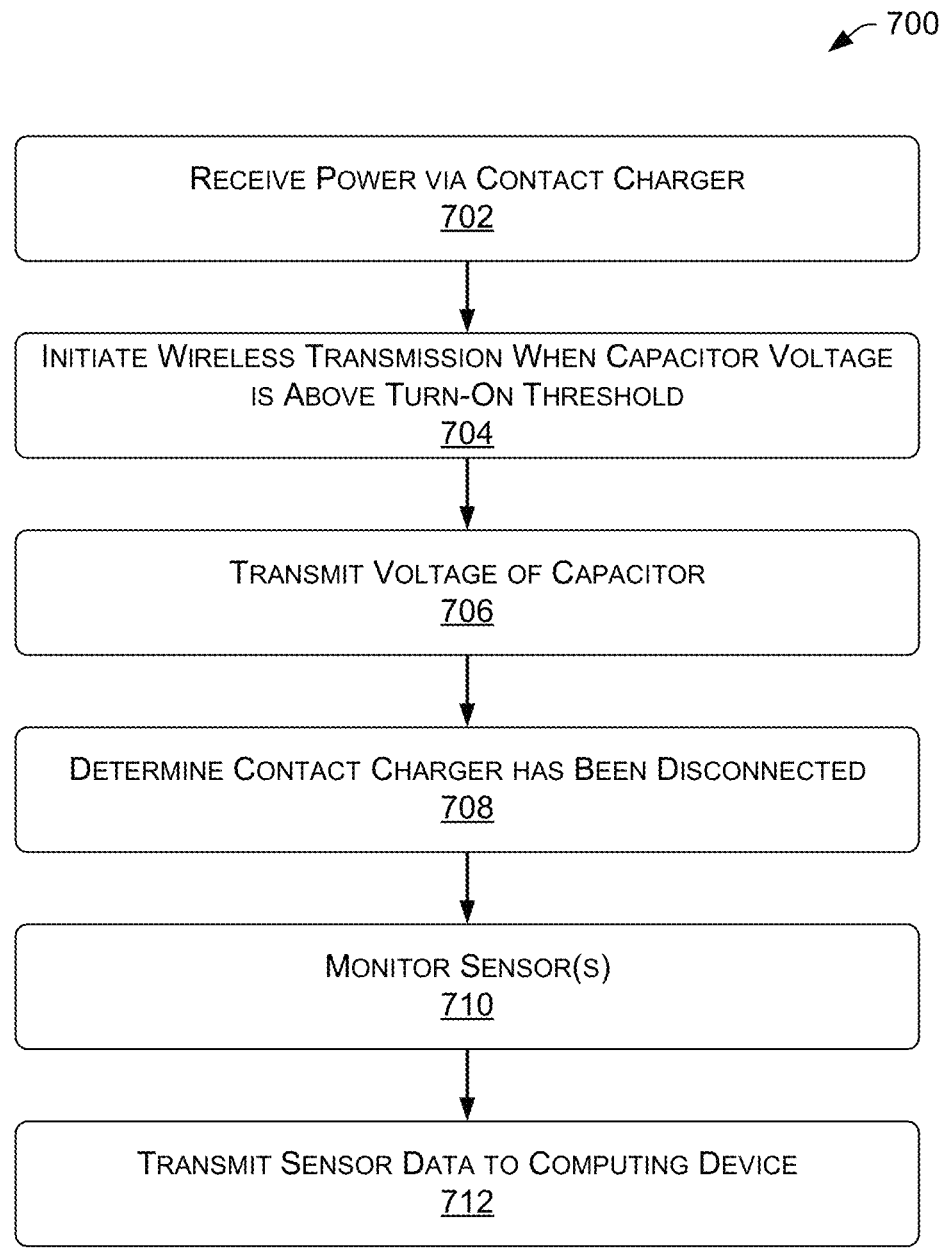
FIG. 7 is a flow diagram of an illustrative process for charging a playable device and wirelessly providing data to a computing device.

FIG. 7 is a flow diagram of an illustrative process 700 for charging a playable device and wirelessly providing data to a computing device. In general, the process 700 is a rapid charging operation that can quickly provide electrical power to the playable device via a portable charger on the order of 10-20 seconds. Of course, various power requirements and operations described herein may cause the rapid charging operations to occur more quickly or more slowly, depending on a particular implementation. The process 700 is described with reference to the environment 200 and may be performed by the playable device(s) 222, the remote charger 236, the computing device(s) 202, the accessory device(s) 238, and/or the network device(s) 252. Of course, the process 700 may be performed in other similar and/or different environments.

At 702, the operation can include receiving power via a contact charger. For example, this operation may include the remote charger 236 providing power to the playable device 222 via a contact-type connection that maintains a connection via external pressure. In some embodiments, the remote charger 236 having a contact-type connection may be referred to as a contact charger. In some instances, the power received via the contact charger 236 may be received as a voltage, and the contact charger 236 may provide current to a capacitor or supercapacitor included in the playable device 222.

At 704, the operation can include initiating a wireless transmission when the capacitor (or supercapacitor) is above a turn-on threshold. For example, the capacitor may correspond to the supercapacitor 304 in FIG. 3A. Upon receiving power, the processor 306 can turn on and initiate operations to begin transmitting via the wireless module 308 and antenna 309. In some instances, the operation 704 can include transmitting via a wireless protocol such as Bluetooth or Bluetooth low energy, and the operation 704 can include scanning for devices or attempting to connect with previously-connected devices.

At 706, the operation can include transmitting a voltage of the capacitor. In some instances, the processor 306 may monitor a voltage of the capacitor and may transmit the voltage of the capacitor via the wireless transmission. In some instances, the analog voltage of the capacitor is received at an analog-to-digital converter at the processor 306, is converted to a digital value, and is transmitted. In some instances, the processor 306 may convert the voltage of the capacitor to a capacity percentage of the capacitor (e.g., with 100% representing a fully-charged capacitor).

At 708, the operation can include determining that the contact charger 236 has been disconnected. In some instances, in response to the operation 708, the playable device 222 can enter a monitoring state initializing one or more sensors.

For example, at 710, the operation can include monitoring sensor(s) of the playable device. In some instances, the operation 710 can include monitoring one or more accelerometers, barometers, gyroscopes, etc. to receive motion data, which may be used to provide a human-computer interface to begin operations for sport, gaming, or play.

At 712, the operation can include transmitting the sensor data to a computing device. In some instances, the operation 712 can include receiving sensor data from the playable device 222 and determining that the sensor data corresponds to a gesture or confirmation that the playable device is to initialize or accept a wireless connection with a computing device 202. For example, in some implementations, a user may bounce the ball to connect the playable device 222 (e.g., as a ball) to a computing device 202. In another implementation, a user 266 may provide a single tap or a double tap to a flying disc to connect the playable device 222 (e.g., as a flying disc) to a computing device 202. In some instances, if a gesture is not received by the playable device 222 or the computing device 202 within a threshold amount of time, the wireless connection is disconnected or refused by the playable device 222 or the computing device 202.

Figure 8:
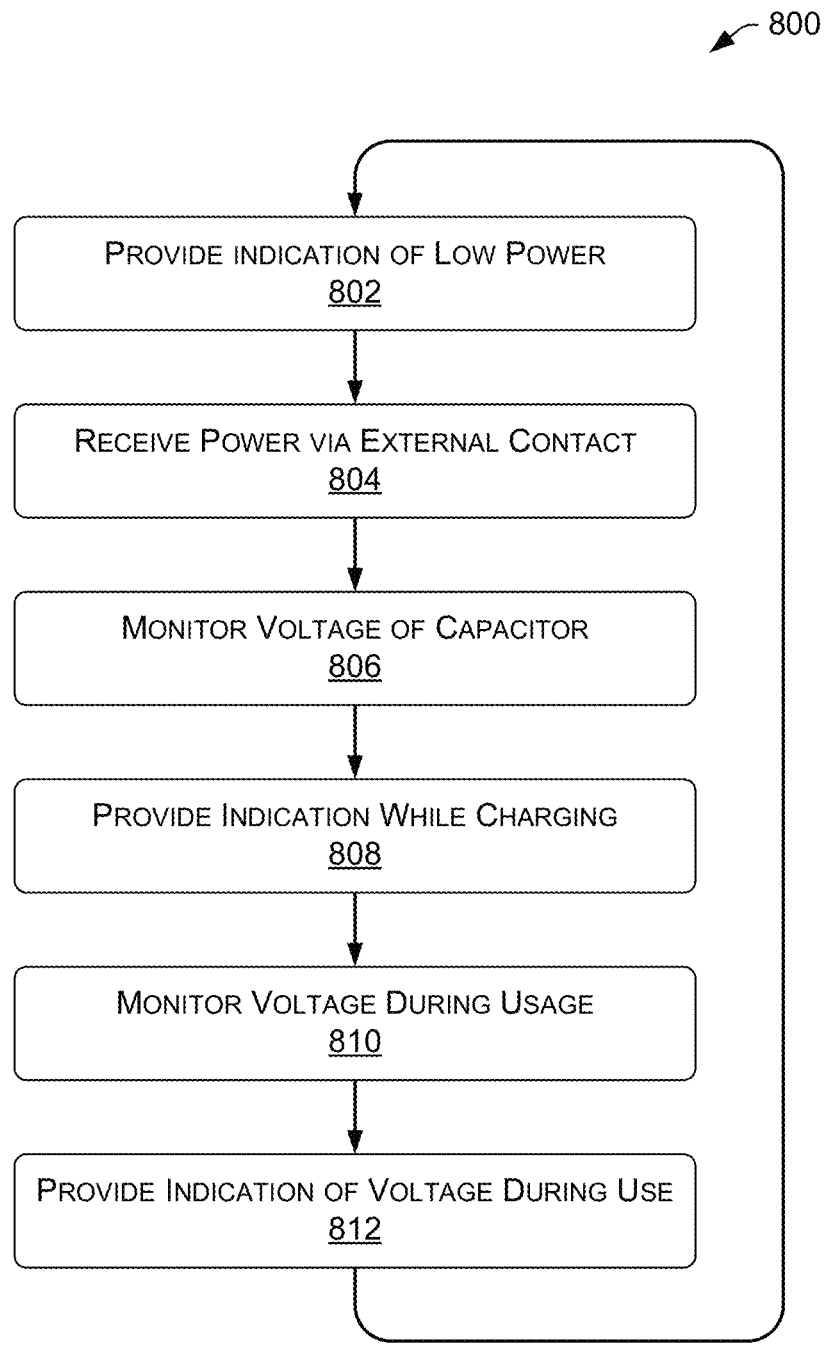
FIG. 8 is a flow diagram of an illustrative process for monitoring a voltage level of a power supply of a playable device and providing an indication of the voltage during use.

FIG. 8 is a flow diagram of an illustrative process 800 for monitoring a voltage level of a power supply of a playable device and providing an indication of the voltage during use. In general, the process 800 continuously monitors a power level of a playable device to ensure that the playable device remains powered during usage. The process 800 is described with reference to the environment 200 and may be performed by the playable device(s) 222, the remote charger 236, the computing device(s) 202, the accessory device(s) 238, and/or the network device(s) 252. Of course, the process 800 may be performed in other similar and/or different environments.

At 802, the operation can include providing an indication of low power. In some instances, a prerequisite to the operation 802 may include the playable device 222 having sufficient power to provide a low power indication. For example, the operation 802 can occur during gameplay after an initialization procedure, such as one described in FIG. 7. In some instances, the operation 802 may include comparing a voltage of a capacitor of the playable device 222 with a threshold voltage level to determine if a power of the capacitor is below a threshold value. More generally, the operation 802 can include determining if an energy module in a playable device has a power capacity above a threshold value. For example, the operation 802 may include monitoring a Coulomb counter to determine an amount of current drawn from an energy module and comparing a count of the Coulomb counter to an expected capacity of the energy module. Various other implementations may be used to determine a low power state of an energy module of a playable device. In some instances, the operation 802 may be based in part on a temperature of the energy module or an ambient temperature. For example, as a temperature decreases, the threshold level for a providing an indication of low power may increase, as an energy module may deplete faster at lower temperatures.

At 804, the operation can include receiving power via an external contact. In some instances, the operation 804 can include receiving power via a remote charger with contact-type connections (e.g., the remote charger 236). At 806, the operation can include monitoring a voltage of a capacitor, as the capacitor receives electrical power via the external contact. In some instances, the capacitor is a supercapacitor providing the primary storage means for storing power in an energy module. In some instances, a voltage of the capacitor may be monitored by an analog-to-digital converter and converted into a capacity level of the capacitor.

At 808, the operation can include providing an indication while charging. In some instances, the operation 808 can include wirelessly transmitting an indication to the computing device 202, such as a progress indication of charging. The indication may be a discrete value of a voltage of the capacitor (e.g., 5.1 volts), a percentage of capacity of an energy module (e.g., 33% full), binary indications of charging (e.g., "in process", "complete", "empty", "full", etc.), or approximations or relative values of progress (e.g., providing stepwise indications such as when a capacity is between 0-25%, 26-50%, 51-75%, etc.). In some instances, an indication may be provided via one or more output devices at the playable device 222 or the accessory device 238, such as via a display or LED, via a speaker, and/or via a haptic device.

At 810, the operation can include monitoring a voltage of the energy module of the playable device during use. For example, the voltage (or power level) of the playable device may be monitored periodically, on request, continuously, etc. At 812, the operation can include providing an indication of a voltage of an energy module during use. In some instances, the operation 812 can include providing an indication wirelessly to a computing device, or via one or more output devices of the playable device, as discussed above. Upon determining that a power level of the playable device 222 is below a threshold value, the processing may continue to the operation 802 to provide an indication of low power, as discussed above.

Figure 9A:
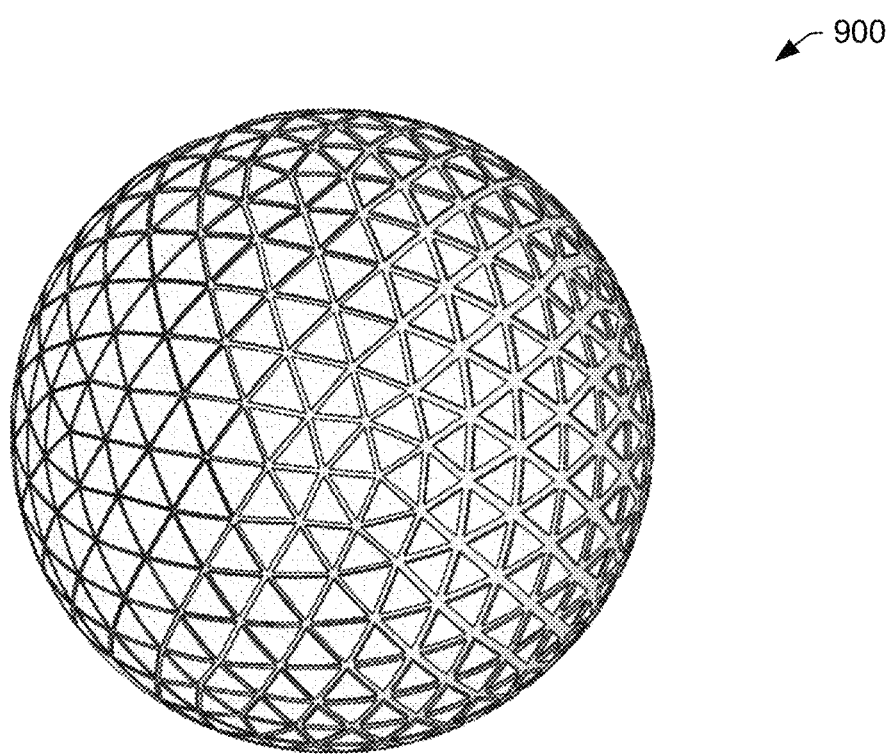
FIG. 9A is a perspective view of a playable device as a ball.

FIG. 9A is a perspective view 900 of a playable device as a ball.

Figure 9B:
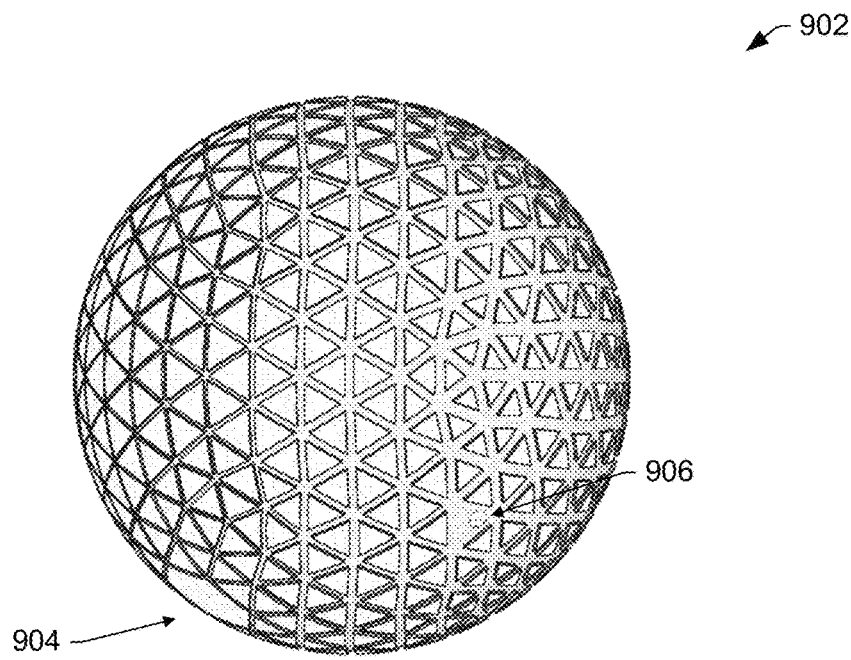
FIG. 9B is a front isometric view of the playable device as the ball.

FIG. 9B is a top isometric view 902 of the playable device as the ball. In some instances, the view 902 may illustrate a logo region 904 and an air valve 906. As shown in FIG. 9B, the air valve 906 is shown in broken lines to denote that this feature may not be limited to the exact shape shown and/or to denote that this feature may not be included in a design. Of course, various embodiments may omit the logo region 904 and/or may use a different shape for a logo region. Further, various embodiments may omit the air valve 906 and/or may use a different shape for a power input region. In various embodiments, the design of the ball may not include the logo region 904 and/or the air valve 906 as an element of the design.

Figure 9C:
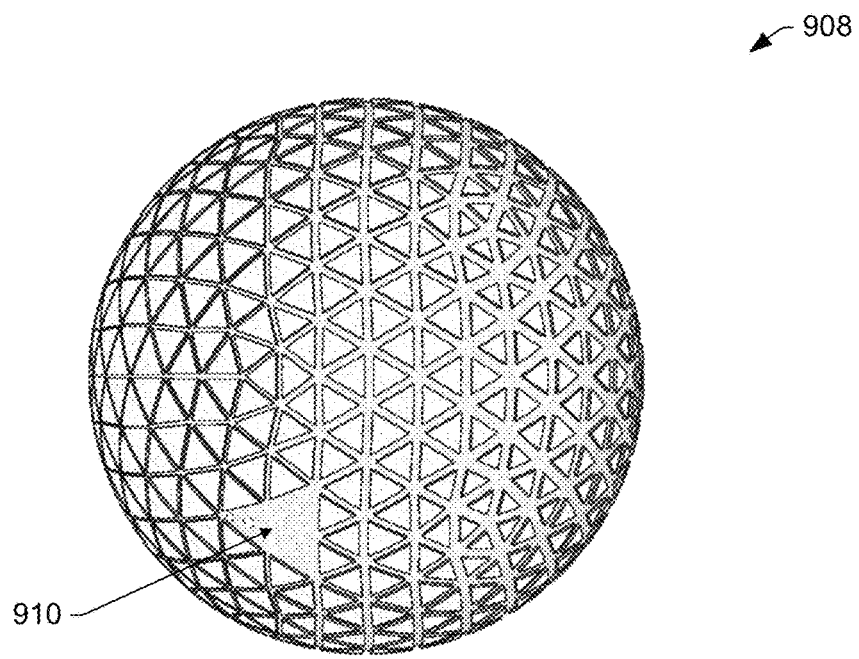
FIG. 9C is a back isometric view of the playable device as the ball.

FIG. 9C is a bottom isometric view 908 of the playable device as the ball. In some instances, the view 908 illustrates a power input region 910 that may correspond to a shape of the power input and/or the power supply as illustrated in FIGS. 5A, 5B, 6A, and 6B, respectively. As shown in FIG. 9C, the power input region 910 is shown in broken lines to denote that this feature may not be limited to the exact shape shown and/or to denote that this feature may not be included in a design. Further, various embodiments may omit the power input region 910 and/or may use a different shape for a power input region. In some instances, the design of the ball may not include the power input region 910 as an element of the design.

Figure 9D:
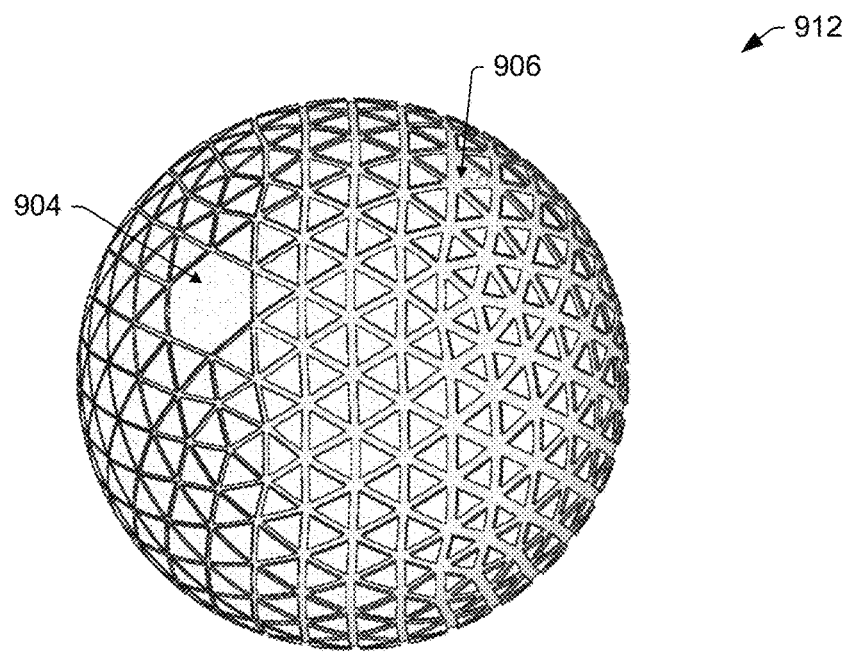
FIG. 9D is a left isometric view of the playable device as the ball.

FIG. 9D is a left isometric view 912 of the playable device as the ball. In some instances, the view 912 may illustrate the logo region 904 and the air valve 906. Of course, various embodiments may omit the logo region 904 and/or may use a different shape for a logo region. Further, various embodiments may omit the air valve 906 and/or may use a different shape for air valve. In various embodiments, the design of the ball may not include the logo region 904 and/or the air valve 906 as an element of the design.

Figure 9E:
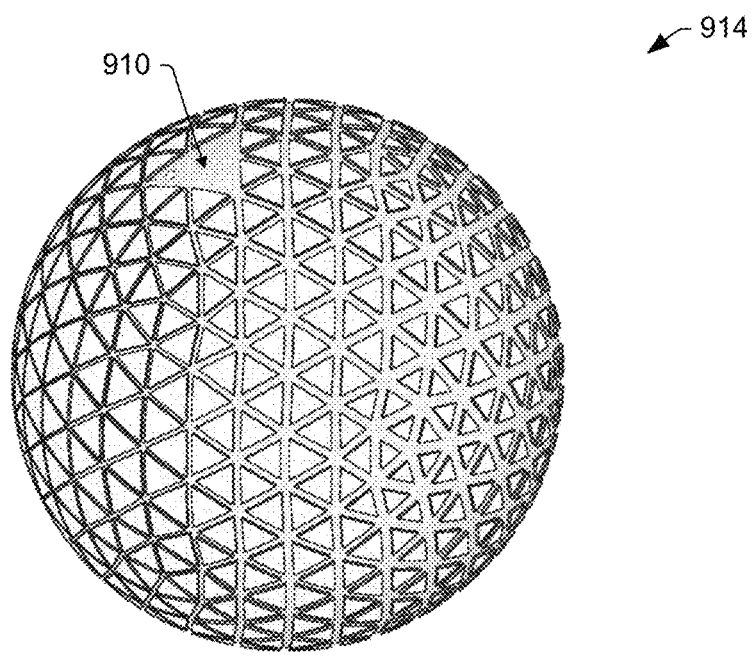
FIG. 9E is a right isometric view of the playable device as the ball.

FIG. 9E is a right isometric view 914 of the playable device as the ball. In some instances, the view 914 illustrates the power input region 910 that may correspond to a shape of the power input and/or the power supply as illustrated in FIGS. 5A, 5B, 6A, and 6B, respectively. Further, various embodiments may omit the power input region 910 and/or may use a different shape for a power input region. In some instances, the design of the ball may not include the power input region 910 as an element of the design.

Figure 9F:
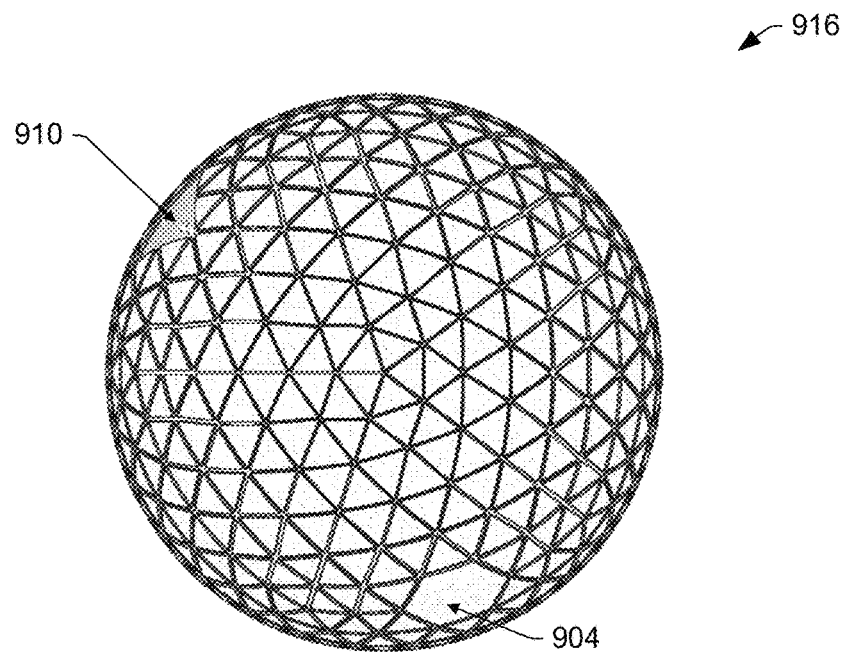
FIG. 9F is a top view of the playable device as the ball.

FIG. 9F is a top view 916 of the playable device as the ball. In some instances, the view 916 may illustrate the logo region 904 and the power input region 910. In some instances, the power input region 910 may correspond to a shape of the power input and/or the power supply as illustrated in FIGS. 5A, 5B, 6A, and 6B, respectively. Of course, various embodiments may omit the logo region 904 and/or may use a different shape for a logo region. Further, various embodiments may omit the power input region 910 and/or may use a different shape for a power input region. In various embodiments, the design of the ball may not include the logo region 904 and/or the power input region 910 as an element of the design.

Figure 9G:
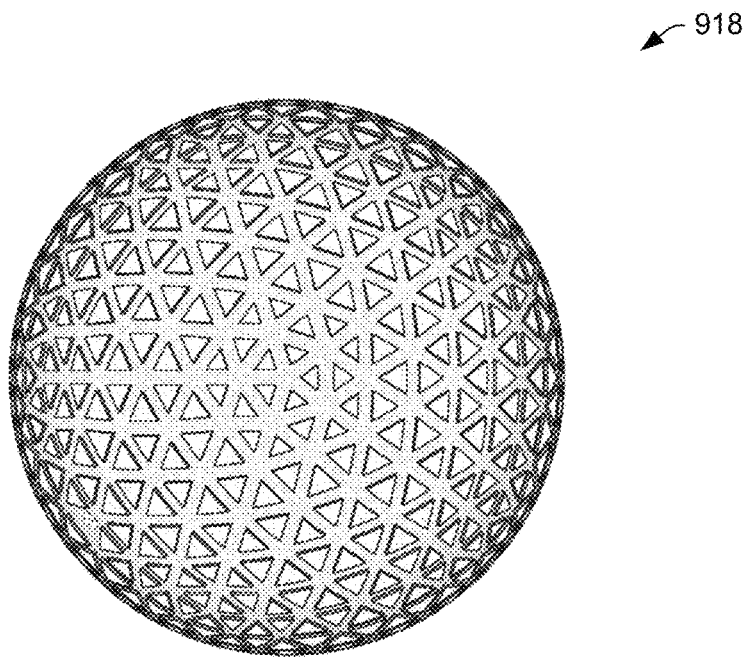
FIG. 9G is a bottom of the playable device as the ball.

FIG. 9G is a bottom view 918 of the playable device as the ball.

A design of the playable device may include some or all of the features shown in the various embodiments of the playable device illustrated in FIGS. 9A-9G. Further, for a corresponding design application associated with the design illustrated in FIGS. 9A-9G, the broken lines in the drawings form no part of any claimed design.

Further, Applicant reserves the right to convert some or all of the broken lines to solid lines, and vice versa, during the course of prosecution of any design applications and/or in one or more continuation applications, since the figures (e.g., FIGS. 9A-9G) convey that the inventors had possession of the features shown in broken lines and solid lines, individually or in various combinations, as of the date of filing.

FIG. 10 illustrates a pictorial flow diagram of a process 1000 for interacting with a computing device via a tap gesture associated with a playable device. The process 1000 is described with reference to the environment 200 and may be performed by the playable device(s) 222, the remote charger 236, the computing device(s) 202, the accessory device(s) 238, and/or the network device(s) 252. Of course, the process 1000 may be performed in other similar and/or different environments.

At 1002, the operation may include presenting a selectable object. For example, the operation 1002 can include presenting a menu 1004 on a display of a computing device 1006. The menu 1004 may include any information, and may include one or more selectable objects, identified in the menu 1004 as "item 1", "item 2", and "item 3", for example. In one particular example, the menu 1004 may be presented in response to an initial connection being made between the computing device 1006 and a playable device 1008 in wireless communication with the computing device 1006. In some instances, the initial connection is made in response to the playable device 1008 receiving power via a rapid charging operation, as discussed herein.

At 1010, the operation may include receiving an indication of a tap gesture. For example, the operation 1010 may include receiving wireless signals from the playable device 1008 including an indication 1012 of a tap gesture. In some instances, the indication 1012 may include a determination that a tap gesture has been detected or performed, and in some instances, the indication 1012 may include motion data or sensor data of the playable device 1008 such that computing device 1006 may interpret the motion data to determine that the motion data represents a gesture (e.g., via the physics engine 214).

Turning to the tap gesture itself, in some instances the tap gesture can be characterized as either a single tap or a double tap. A single tap may include a pulse of acceleration in a first direction, followed by a rebound acceleration in a second (e.g., opposite or substantially opposite) direction. The pulse acceleration and rebound acceleration may occur within a threshold amount of time or a time window, for example, on the order of 10 milliseconds. The pulse acceleration may exceed a threshold acceleration value. In some instances, determining a tap gesture may include determining that the pulse acceleration falls below the threshold acceleration value within a particular time period, such as the time window discussed above. A double tap may include two pulses within a threshold amount of time, such as 500 milliseconds. In some instances, a second pulse in the double tap gesture may occur beyond a threshold amount of time (e.g., a minimum delay may occur prior to a second tap in a double tap gesture). As may be understood in the context of this disclosure, time thresholds may be selected from a range of values and are not limited to those discussed herein.

In some instances, one or more gestures may be programmable by a game developer and/or programmable by a user of the playable device. For example, a user (or developer) may record a gesture to define a particular gesture. Further, the user (or developer) may define actions based on the particular gesture or based on a sequence of gestures.

As illustrated in FIG. 10, a user may be represented by a first hand 1014 and a second hand 1016. A user (e.g., the user 266) may hold the playable device in the first hand 1014 and may swiftly contact the playable device 1008 with the second hand 1016, producing the tap gesture represented as a contact 1018. In one example, the second hand 1016 may follow a motion indicated by arrows 1020. As may be understood, the first hand 1014 may hold the playable device 1008 and may move the playable device 1008 to contact a surface such as a wall or a ground surface to trigger a tap gesture.

At 1022, the operation may include selecting an object in response to the tap gesture. For example, the computing device 1006 may display a selection 1024 in the menu 1004. In response to receiving the tap gesture, the operation may include selecting the item indicated by the selection 1024.

At 1026, the operation may include performing an action in response to the tap gesture. In some instances, depending on a context of the menu 1004 and/or the selection 1024, the computing device 1006 may perform an action based on the tap gesture. For example, a computing device 1028 represents the computing device 1006 following a selection in the operation 1022. As illustrated in FIG. 10, the action may include navigating to another menu, such as a menu 1030. In some instances, the menu 1030 may include additional items for selection, such as item 1032.

As may be understood in the context of the disclosure, the action performed in response to the tap gesture may be based upon a context of a menu 1004, and may include any number of operations. For example, an action may include, but is not limited to, navigation to another menu, selection of one or more characters for text entry, commencement of a game, termination of gameplay, confirming an identity of a user, indication of a game event, initiation of video analysis, etc. In some instances, the action may include interpreting subsequent motion data received from the playable device 1008 as motion of the playable device 1008 corresponding to gameplay rather than as gestures, for example.

Figure 11A:
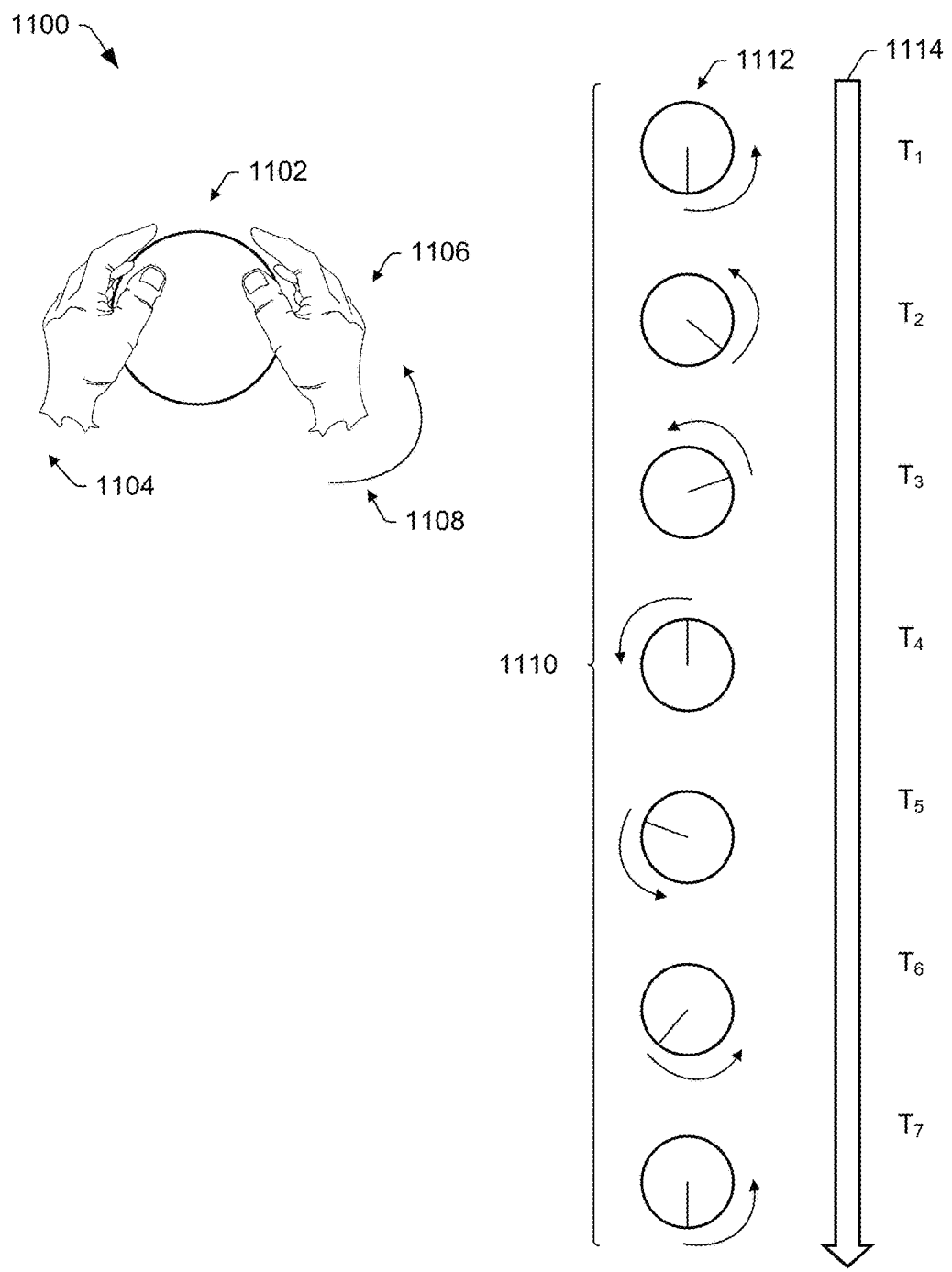
FIG. 11A illustrates a first spin gesture associated with a playable device.

FIG. 11A illustrates a first spin gesture 1100 associated with a playable device. In general, the spin gesture 1100 includes rotation of a playable device in a single direction, and can include any number of rotations. For example, a user may hold a playable device 1102 in a first hand 1104 and use a second hand 1106 to rotate the playable device 1102 in a single direction, as illustrated by an arrow 1108. An exemplary rotation of the playable device 1102 is shown in example 1110, illustrating a spin of a playable device 1112 over a period of time represented on a timeline 1114. For example, the playable device 1112 includes a radial line as a reference point to illustrate rotation of the playable device 1112 over time.

In some instances, the spin gesture illustrated in FIG. 11A can be determined by a number of rotations (or a degree of spin) of the playable device 1102 or 1112 within a threshold period of time or within a time window. A number of rotations or degree of spin, and a threshold period of time or time window, may depend on a particular implementation of the playable device. In one example, the spin gesture may be defined by a minimum rotation (e.g., ¼ rotation, or 90 degrees) within 500 milliseconds. If a minimum degree of spin occurs outside a threshold time period, in some instances, the motion may be determined not to correspond to a spin gesture.

In accordance with embodiments of the disclosure, the motion data corresponding to a spin of a playable device may be transmitted to a computing device and interpreted by the computing device as a gesture interaction with the computing device. In one embodiment, the spin gesture can be used to navigate within a menu, for example, as part of selecting an object from a plurality of selectable objects. In some instances, a selection of an object from a plurality of objects may depend on a rotation amount of the playable device. For example, a menu selector may travel or cycle through selectable objects while the computing device is receiving a spin gesture. In an example where a user is selecting letters from an alphabet (e.g., to enter a user identity), a single rotation may navigate from a first character to a second character (e.g., from "A" to "B") while a spin of the playable device of a second, larger number of rotations may navigate from the first character to a third or fourth character (e.g., from "A" to "C" or "D"). In some instances, for example, while traversing a list of selectable objects, a direction of traversal may be based on a direction of spin of the playable device. That is, spin in a first direction may traverse the list in a first direction, while spin in a second direction may traverse the list in a second direction.

Figure 11B:
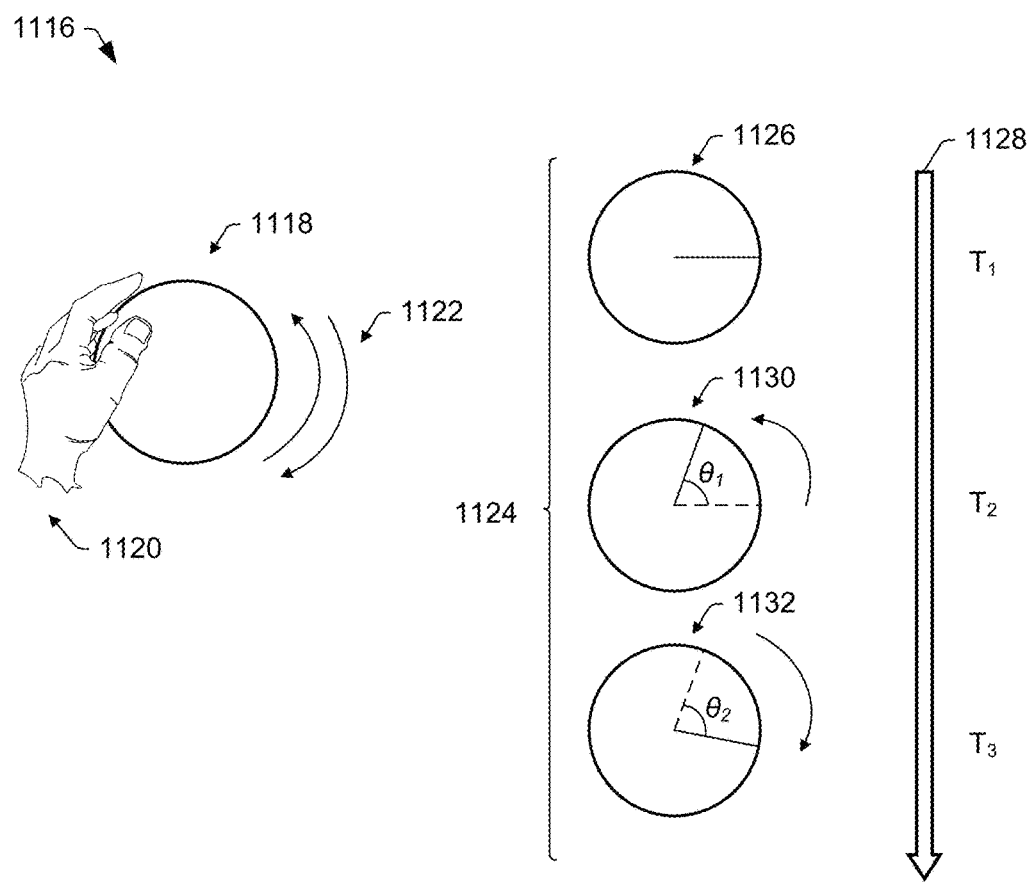
FIG. 11B illustrates a second spin gesture associated with a playable device.

FIG. 11B illustrates a second spin gesture 1116 associated with a playable device. In some instances, the second spin gesture 1116 may be distinguished from the first spin gesture by the second spin gesture rotating a first direction, stopping, followed by rotation in a second direction. For example, a user may hold a playable device 1118 in a first hand 1120 and may rotate the playable device in a range of motion of the user's wrist, for example, indicated by arrows 1222.

An example 1124 illustrates the second spin gesture of a playable device 1126 over time on a timeline 1128. As illustrated in FIG. 11B, the playable device 1126 includes a radial line to illustrate rotation over time. At $T_1$, or a first time, the playable device 1126 can be considered at rest. At $T_2$, or a time after $T_1$, a playable device 1130 is rotated a first direction with a degree of rotation of $\theta_1$. At $T_3$, or a time after $T_2$, the playable device is rotated in a second direction with a degree of rotation of $\theta_2$. In some instances, the second direction may be substantially opposite the first direction of rotation.

In some instances, detecting the second spin gesture 1116 may include determining the degrees of rotation $\theta_1$ and $\theta_2$ above or below a threshold value. In some instances, the first and second rotation can occur below a threshold amount of time. In some instances, the degrees of rotation $\theta_1$ and $\theta_2$ may be within a threshold value (e.g., the playable device 1132 may return to an orientation substantially similar as the playable device 1126). Of course, degrees of rotation and a threshold values or periods of time may depend on a particular implementation of the playable device.

In accordance with embodiments of the disclosure, the motion data corresponding to a spin of a playable device may be transmitted to a computing device and interpreted by the computing device as a gesture interaction with the computing device. In some instances, the computing device may analyze motion data to distinguish between the first spin gesture 1100 and the second spin gesture 1116. In some instances, the second spin gesture 1116 may be used to navigate to a next element in traversable list, for example. In some instances, the second spin gesture 1116 can be used to provide fine selection control, while the first spin gesture can be used allow faster navigation or traversal of a list, or vice versa.

In some instances, gestures can be used in combination to navigate between menu items (e.g., using spin gestures) and to select a selectable object (e.g., using tap gestures). Of course, tap gestures can be used to navigate between menu items while spin gestures can be used to select an item, depending on a particular implementation of a playable device and/or application or game on a computing device associated with the playable device.

Figure 12:
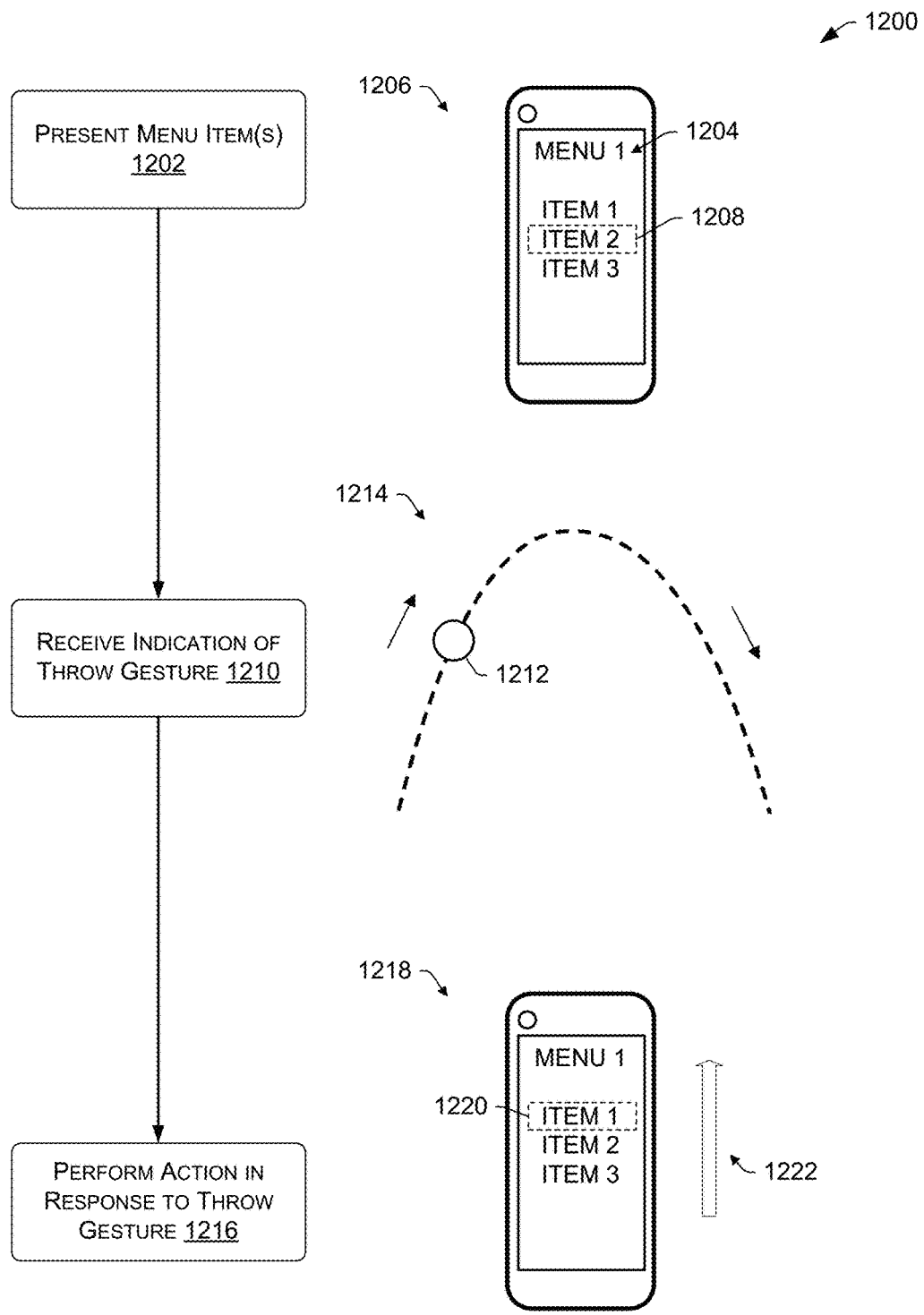
FIG. 12 illustrates a pictorial flow diagram of a process for interacting with a computing device via a throw gesture associated with a playable device.

FIG. 12 illustrates a pictorial flow diagram of a process 1200 for interacting with a computing device via a throw gesture associated with a playable device. The process 1200 is described with reference to the environment 200 and may be performed by the playable device(s) 222, the remote charger 236, the computing device(s) 202, the accessory device(s) 238, and/or the network device(s) 252. Of course, the process 1200 may be performed in other similar and/or different environments.

At 1202, the operation may include presenting one or more menu items. For example, a menu 1204 may be presented on a display of a computing device 1206. As discussed herein, the menu 1204 may be presented in connection with a playable device in wireless communication with the computing device 1206. In some instances, the menu 1204 may include a plurality of selectable items, with one item selected via a selector 1208.

At 1210, the operation may include receiving an indication of a throw gesture. In some instances, a computing device may receive motion data (or more generally, sensor data) from a playable device 1212 during a throw 1214, for example, and may interpret the motion data as a throw. For example, the motion data may include acceleration data associated with a velocity, acceleration data or an indication that the playable device 1212 is in free fall, and/or data from a barometer indicating a height of the playable device 1212 throughout the throw 1214. In some instances, a physics engine (such as the physics engine 214) may receive motion data and determine that the motion of the playable device 1212 corresponds to a throw.

At 1216, the operation may include performing an action in response to the throw gesture. For example, as shown in a computing device 1218, the action may include navigating a menu in a particular direction, such as traversing up in a vertically oriented list. Following the throw 1214, the selector 1208 selecting "Item 2" can be moved to a selector 1220 selecting "Item 1". An arrow 1222 represents a navigation of the selector 1208 and 1220. In some instances, navigation from one menu item to another can be provided as an animation in the computing device 1218. In some instances, an action may be based in part on an air time of the throw gesture (e.g. how high the playable device was thrown) and/or may be based in part on a deceleration of the playable device upon catching the playable device.

As may be understood in the context of the disclosure, any action may be performed in response to the throw gesture (e.g., the throw 1214) and is not limited to a particular direction of navigation within a menu of selectable objects. For example, the action performed in response to the throw gesture may depend on an implementation of the playable device and/or a game or application receiving gestures from the playable device.

As may be understood in the context of this disclosure, a throw gesture (and indeed any of the gestures described herein) may include one user or multiple users. For example, a user can throw the playable device in the air and catch the playable device by himself or herself. In another embodiment, first user can throw a playable device to a second user.

Figure 13:
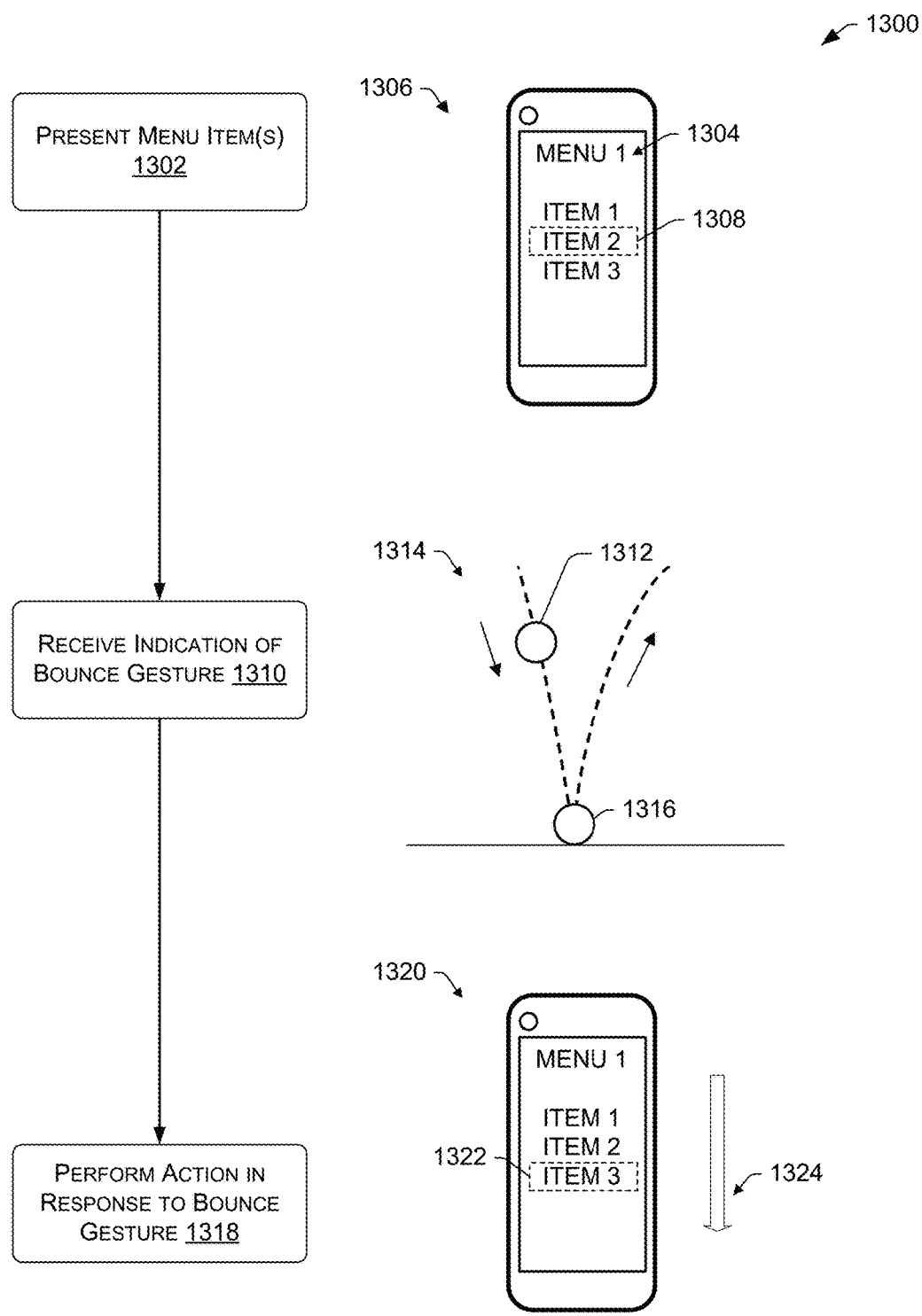
FIG. 13 illustrates a pictorial flow diagram of a process for interacting with a computing device via a bounce gesture associated with a playable device.

FIG. 13 illustrates a pictorial flow diagram of a process 1300 for interacting with a computing device via a bounce gesture associated with a playable device. The process 1300 is described with reference to the environment 200 and may be performed by the playable device(s) 222, the remote charger 236, the computing device(s) 202, the accessory device(s) 238, and/or the network device(s) 252. Of course, the process 1300 may be performed in other similar and/or different environments.

At 1302, the operation may include presenting one or more menu items. For example, a menu 1304 may be presented on a display of a computing device 1306. As discussed herein, the menu 1304 may be presented in connection with a playable device in wireless communication with the computing device 1306. In some instances, the menu 1304 may include a plurality of selectable items, with one item selected via a selector 1308.

At 1310, the operation may include receiving an indication of a bounce gesture of a playable device. For example, a playable device 1312 may be thrown or dropped along a path 1314 such that the playable device 1312 contacts with the ground at 1316 and continues along the path 1314. As discussed above, a physics engine of the computing device 1306 may receive motion data (including accelerometer data and/or barometer data) and interpret the data to determine that motion of the playable device 1312 corresponds to a bounce gesture.

At 1318, the operation may include performing an action in response to the bounce gesture. For example, as shown in a computing device 1320, the action may include navigating a menu in a particular direction, such as traversing down in a vertically oriented list. Following the bounce at 1316, the selector 1308 selecting "Item 2" can be moved to a selector 1322 selecting "Item 3". An arrow 1324 represents a navigation of the selector 1308 and 1322.

As may be understood in the context of the disclosure, any action may be performed in response to the bounce gesture (e.g., the path 1314 and bounce at 1316) and is not limited to a particular direction of navigation within a menu of selectable objects. Further, the action is not limited to navigation, and may include selection, returning to a previous menu, commencing a game, switching modes (e.g., from a mode interpreting motion as gestures to a mode interpreting motion as movement of a playable device). For example, the action performed in response to the throw gesture may depend on an implementation of the playable device and/or a game or application receiving gestures from the playable device.

Figure 14:
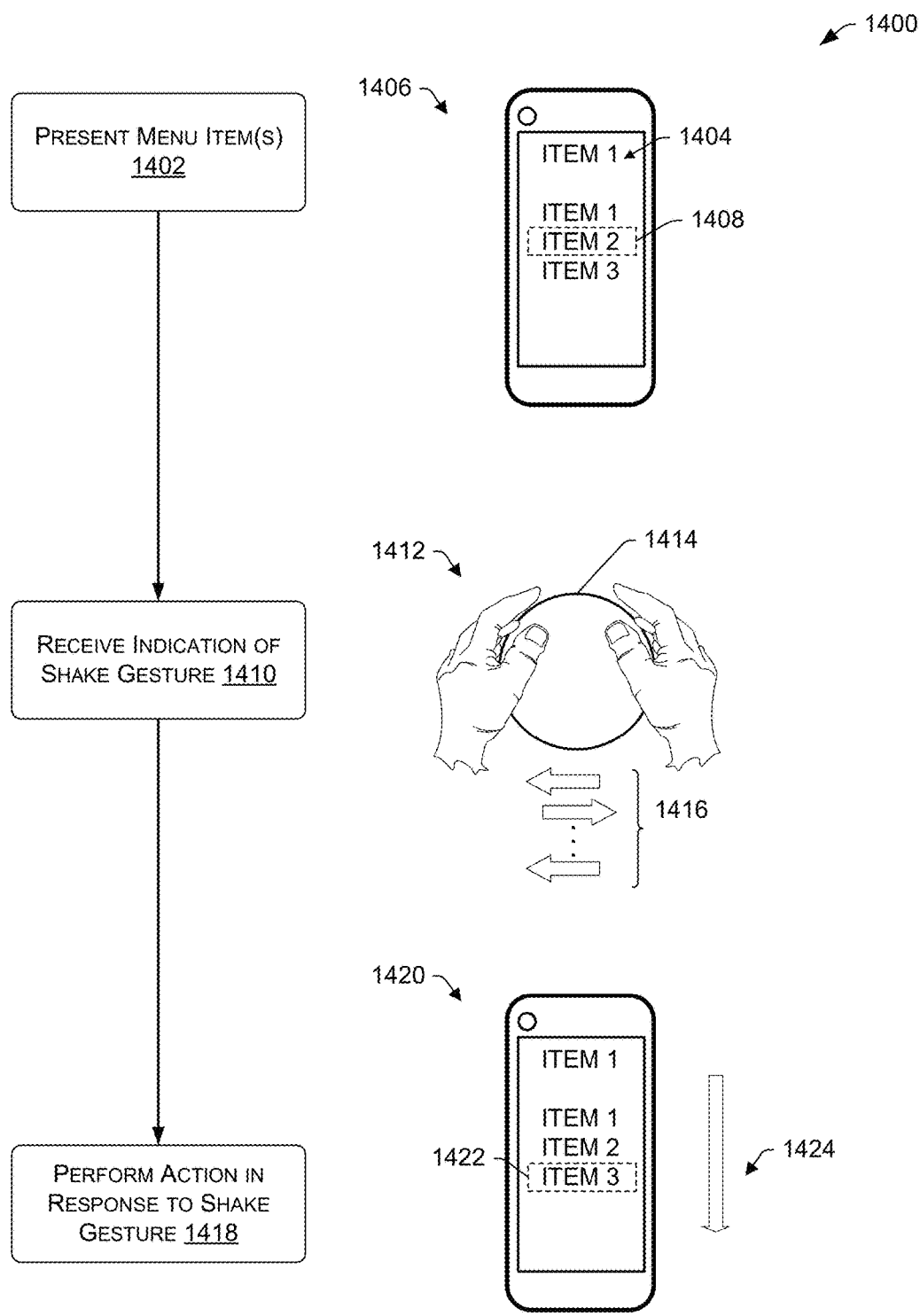
FIG. 14 illustrates a pictorial flow diagram of a process for interacting with a computing device via a shake gesture associated with a playable device.

FIG. 14 illustrates a pictorial flow diagram of a process 1400 for interacting with a computing device via a shake gesture associated with a playable device. The process 1400 is described with reference to the environment 200 and may be performed by the playable device(s) 222, the remote charger 236, the computing device(s) 202, the accessory device(s) 238, and/or the network device(s) 252. Of course, the process 1400 may be performed in other similar and/or different environments.

At 1402, the operation may include presenting one or more menu items. For example, a menu 1404 may be presented on a display of a computing device 1406. As discussed herein, the menu 1404 may be presented in connection with a playable device in wireless communication with the computing device 1406. In some instances, the menu 1404 may include a plurality of selectable items, with one item selected via a selector 1408.

At 1410, the operation may include receiving an indication of a shake gesture. An example 1412 illustrates a user shaking a playable device 1414 back and forth in a directions provided by arrows 1416. In some instances, a shake gesture can be determined by one or more characteristics of the shake, such as a number of back and forth motions, a magnitude of acceleration in either direction, a threshold amount of time or a time window in which acceleration pulses corresponding to shake direction changes are to be detected, etc. As can be understood, a shake gesture can be determined by motion data received by the computing device 1406 and interpreted by a physics engine and/or gesture library, such as the physics engine 214 and the gesture library 218 of FIG. 2.

At 1418, the operation may include performing an action in response to the shake gesture. For example, as shown in a computing device 1420, the action may include navigating a menu in a particular direction, such as traversing down in a vertically oriented list. Following the shake illustrated in the example 1412, the selector 1408 selecting "Item 2" can be moved to a selector 1422 selecting "Item 3". An arrow 1424 represents a navigation of the selector 1408 and 1422.

As may be understood in the context of the disclosure, any action may be performed in response to the shake gesture and is not limited to a particular direction of navigation within a menu of selectable objects. Further, the action is not limited to navigation, and may include selection, returning to a previous menu, commencing a game, switching modes (e.g., from a mode interpreting motion as gestures to a mode interpreting motion as movement of a playable device). For example, the action performed in response to the shake gesture may depend on an implementation of the playable device and/or a game or application receiving gestures from the playable device.

Figure 15:
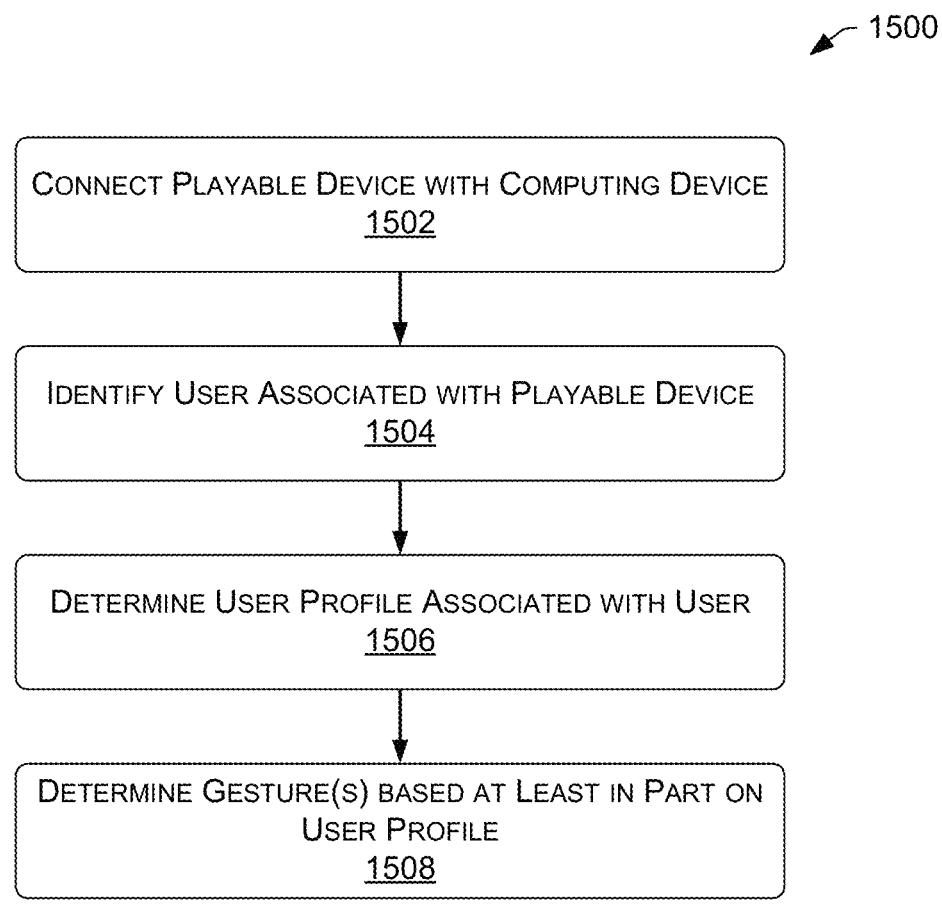
FIG. 15 is a flow diagram of an illustrative process for identifying a user for interacting with a computing device via a playable device.

FIG. 15 is a flow diagram of an illustrative process 1500 for identifying a user for interacting with a computing device via a playable device. The process 1500 is described with reference to the environment 200 and may be performed by the playable device(s) 222, the remote charger 236, the computing device(s) 202, the accessory device(s) 238, and/or the network device(s) 252. Of course, the process 1500 may be performed in other similar and/or different environments.

At 1502, the operation may include connecting a playable device with a computing device. For example, the operation 1502 may including establishing a wireless connection between the playable device 222 and the computing device 202. In some instances, this may include receiving a wireless signal from the playable device 222 and a gesture indication from the playable device 222 in response to a visual or audio prompt on the computing device 202 to perform a gesture to connect the devices 202 and 222. For example, a prompt may include instructions displayed via the computing device 202 to "Bounce the ball to connect". In response, a user may bounce the ball (e.g., the playable device 222), which may transmit motion data to the computing device 202, interpreted as a bounce gesture, thereby establishing a connection between the playable device 222 and the computing device 202.

At 1504, the operation may include identifying a user (e.g., the user 266) associated with the playable device 222. For example, the computing device 202 may provide an interface allowing the user 266 to select one of a plurality of predetermined user profiles, or the user 266 may establish a new profile. In some instances, the user 266 can select a profile or establish a new profile using gestures associated with the playable device 222, as discussed herein. In some instances, the computing device 202 may receive image data and perform image analysis including facial recognition to determine an identity of the user 266. In some instances, the playable device 222 or the computing device 202 may receive audio associated with the user 266 and perform voice recognition or perform speech to text analysis to determine an identity of the user 266. In some instances, the user 266 can indicate an identity by performing one or more gesture signatures that may be uniquely associated with the user 266 or a user profile associated with the user 266.

At 1506, the operation may include determining a user profile associated with the user 266. The user profile may include preferences of the user 266, games or applications (e.g., associated with the application module 216) that are accessible by the user 266, various thresholds (e.g., accelerometer thresholds when performing one or more gestures), historical data (e.g., relating to gameplay, such as scores or motion data (e.g., fastest thrown, highest thrown, etc.)), gesture preferences (e.g., mapping gestures to actions, calibration data, machine learning data, etc.). In some instances, a user profile can be stored in the computing device 202, the playable device 222, and/or the network device 252.

At 1508, the operation may include determining gestures based at least in part on the user profile. For example, a particular user profile may include gesture preferences, for example, mapping one particular gesture to a particular action. In some instances, the user profile can include various acceleration thresholds or time period thresholds associated with the user 266 to increase an accuracy of gesture detection and/or to decrease occurrences of false negatives. In some instances, the gesture library 218 can include a machine learning module to receive motion data associated with the user and to adjust thresholds associated with determining gestures to personalize gesture detection based on a user profile. By way of example, and without limitation, the machine learning module may determine that motion data associated with the user 266 indicates failed double tap gestures, caused by a second tap occurring beyond a time threshold after the first tap of the double tap gestures. The machine learning module can increase a time threshold in which a second tap follows a first tap of a double tap gesture to allow a slower double tap to register as a double tap gesture. In another example, in a first user profile, a bounce gesture may be mapped to a selection action, while in a second user profile, the bounce gesture may be mapped to a navigation action. Other embodiments and implementations are within the scope of this disclosure.

Figure 16:
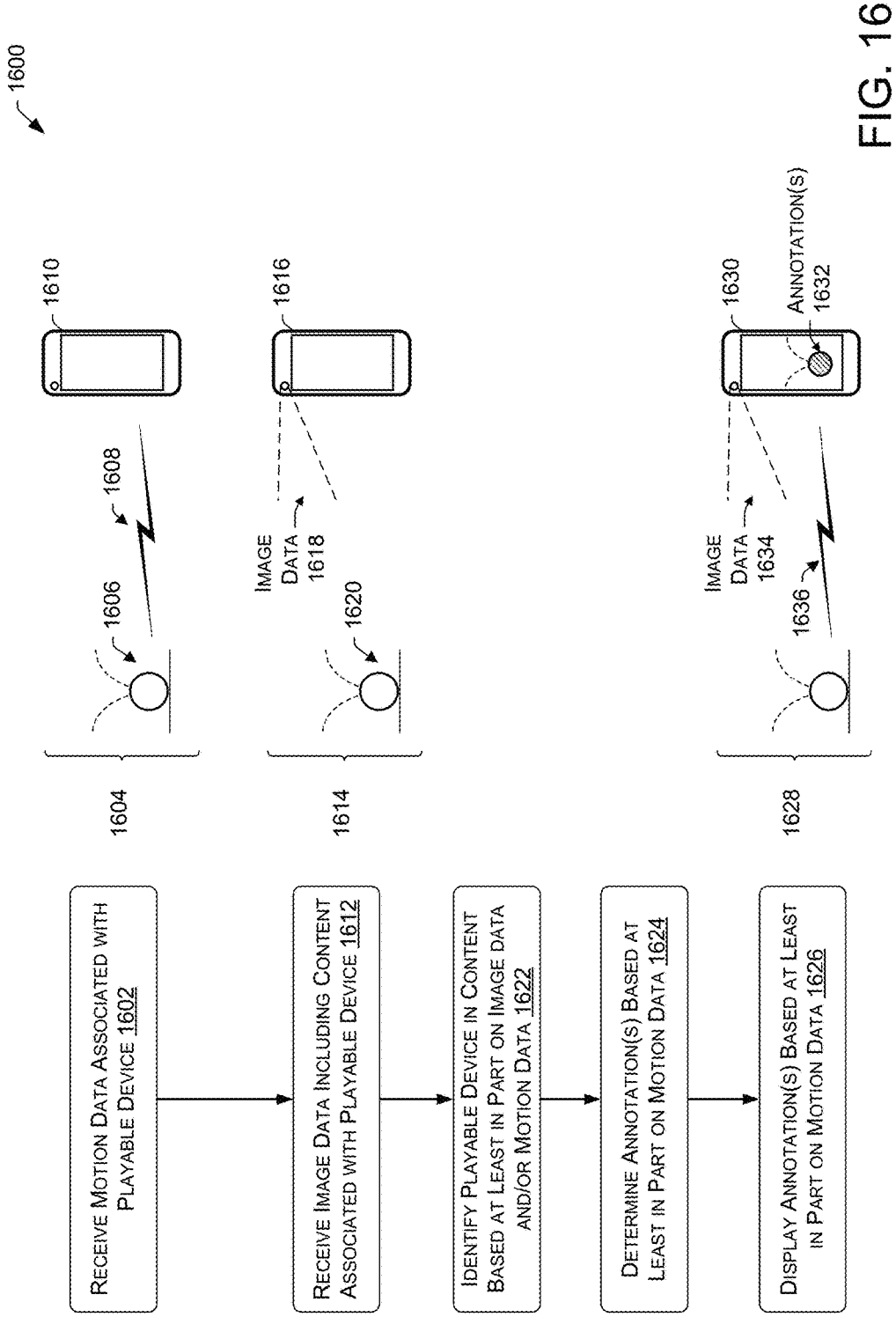
FIG. 16 illustrates a pictorial flow diagram of a process for associating motion data and image data of a playable device for providing annotations to the image data.

FIG. 16 illustrates a pictorial flow diagram of a process 1600 for associating motion data and image data of a playable device for providing annotations to the image data. The process 1600 is described with reference to the environment 200 and may be performed by the playable device(s) 222, the remote charger 236, the computing device(s) 202, the accessory device(s) 238, and/or the network device(s) 252. Of course, the process 1600 may be performed in other similar and/or different environments.

At 1602, the operation may include receiving motion data associated with a playable device. An example 1604 illustrates a playable device 1606 in motion and transmitting motion data 1608 to a computing device 1610. Although illustrated as a bounce, the example 1604 may include any motion of the playable device 1606. In some instances, the motion data 1608 (also referred to as sensor data) may represent motion data during gameplay and/or during gesturing of the playable device 1606.

At 1612, the operation may include receiving image data including content associated with the playable device. An example 1614 illustrates a computing device 1616 capturing image data 1618 which includes a representation of a playable device 1620. In some instances, a viewable region of an imaging device of the computing device 1616 may be referred to as a frame. Thus, some or all of the playable device 1620 may be represented in a frame of the computing device 1616.

At 1622, the operation may include identifying a playable device in the content based at least in part on image data and/or motion data. For example, the image analysis module 220 may perform image analysis on the image data perform objection detection based on a size, shape, and/or color of the playable device. In some instances, motion data received in the operation 1602 can be used in identifying the playable device in image data. For example, based on the motion data, the physics engine 214 can determine a height, velocity, acceleration, spin, direction, speed, etc. of the playable device. The image analysis module 220 can receive motion data and/or attributes of the playable device determined by the physics engine 214. Further, the image analysis module 220 can analyze frames of image data to determine if any objects in the frames include a motion path similar to that indicated by the motion data from the playable device. In some instances, identifying a playable device in image data based at least in part on motion data can improve an accuracy of identification and/or can increase a processing performance by excluding objects that do not correspond to the motion data. Further, performance can be improved by distinguishing between multiple moving objects, for example.

At 1624, the operation may include identifying annotations based at least in part on motion data. For example, annotations can be any audio, visual, or haptic feedback associated with motion of the playable device and/or associated with the motion of the playable device as it relates to gameplay. By way of example, and without limitation, annotations can be used to differentiate between motion characteristic in a path of the playable device, such as mapping a color of an annotation to a speed of the playable device. Annotations can be further based on detection and/or determination of one or more game events, such as starting a task or level, completing a task or level, reaching a milestone, etc. Annotations can be based in part on historical motion data, such as motion data corresponding to extremes (e.g., highest, fastest, most spins, etc.). In some instances, annotations can be based at least in part on a user profile, for example, by selecting colors, themes, skins, etc. for annotations. In some instances, annotations may also correspond to users identified in image data, such as adding costumes or avatar data to users identified in image data.

In some instances, various annotation themes can be provided based on seasonal events and/or a location of the playable device or a location of a computing device in communication with the playable device. For example, annotations during winter may feature snowflakes and snowfall, while annotations at a beach or during the summer may feature sunshine and palm trees. As may be understood in the context of the disclosure, a wide variety of annotations may be used to decorate image data and/or to increase an engagement of a user or to increase interactivity of the user with the computing device and/or playable device.

At 1626, the operation may include displaying annotations based at least in part on the motion data. Example of annotations have been given throughout this disclosure. An example 1628 illustrates a computing device 1630 displaying one or more annotations 1632 based on image data 1634 received including a representation of a playable device and further based on motion data 1636 received from the playable device, as described herein.

Figure 17:
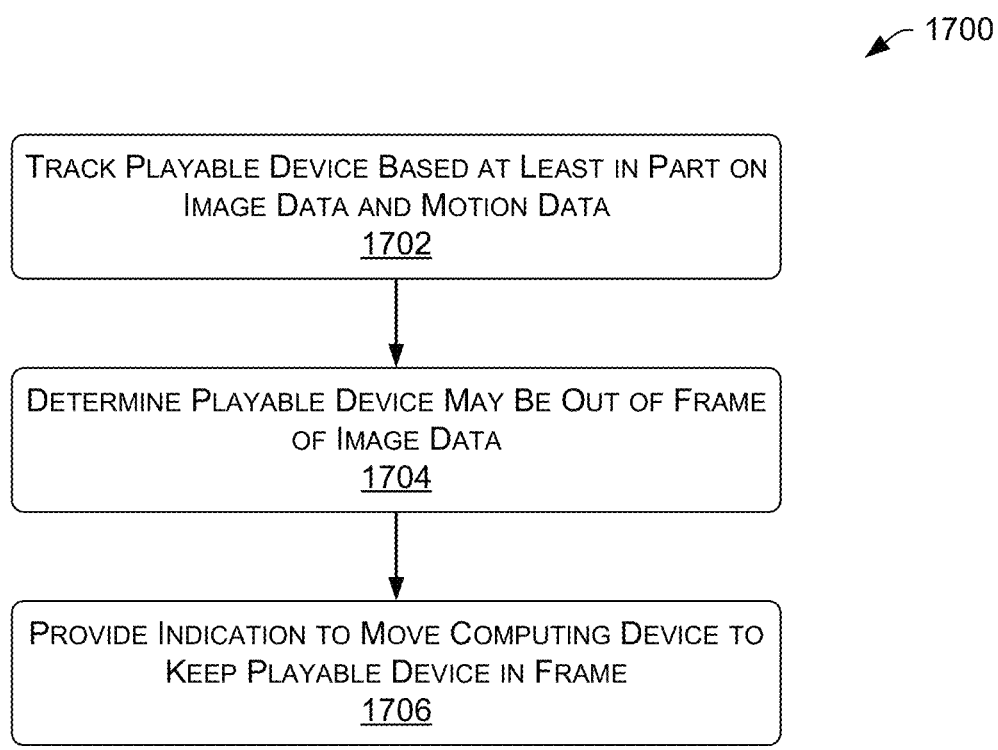
FIG. 17 is a flow diagram of an illustrative process for utilizing motion data from a playable device to provide indications to maintain the playable device in frame for imaging the playable device.

FIG. 17 is a flow diagram of an illustrative process 1700 for utilizing motion data from a playable device to provide indications to maintain the playable device in frame for imaging the playable device. The process 1700 is described with reference to the environment 200 and may be performed by the playable device(s) 222, the remote charger 236, the computing device(s) 202, the accessory device(s) 238, and/or the network device(s) 252. Of course, the process 1700 may be performed in other similar and/or different environments.

At 1702, the operation may include tracking a playable device based at least in part on image data and motion data. In some instances, a computing device may be oriented to capture image data (e.g., video) of the playable device during gameplay between users, the gameplay including the playable device. In some instances, a user may be holding the computing device and moving the computing device to maintain the playable device in a frame of the computing device. The playable device may identify the playable device based on analysis performed by the physics engine 214 and/or the image analysis module 220 as described herein.

At 1704, the operation may include determining that the playable device may be out of the frame of the image data. That is, the computing device may determine, based on the motion data of the playable device and based on an extrapolated or estimated position of the playable device, such that the playable device may travel beyond a frame of the computing device, such that the imaging device of the computing device may not capture a representation of the playable device.

At 1706, the operation may include providing an indication to move the computing device to keep the playable device in a frame of the imaging device of the computing device. For example, as image data is captured by the computing device and displayed on a display of the computing device, the operation 1706 may include displaying directional arrows, hints, messages, notification, etc., on a display in a direction to orient the imaging device. In some instances, indication to move the imaging device may be provided along with an annotation identifying the playable device to assist the user in capturing the gameplay.

Thus, a playable device can be utilized in conjunction with one or more computing devices, accessory device, and/or network devices to provide interactivity between users and the playable device during play to create joy, wonder, and fun!

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    a smart playable device including:
        one or more electrical power supplies disposed in the smart playable device; and
        an electronics assembly removably coupled to the smart playable device, the electronics assembly including at least a printed circuit board electrically coupled to the one or more electrical power supplies, the electronics assembly including at least:
            an interface to receive power from the one or more electrical power supplies and to provide power to one or more components mounted on the printed circuit board;
            one or more processors mounted on the printed circuit board;
            a first accelerometer mounted on the printed circuit board;
            a second accelerometer mounted on the printed circuit board;
            one or more magnetometers mounted on the printed circuit board;
            a wireless module mounted on the printed circuit board; and
            an antenna coupled to the wireless module;
            wherein the one or more processors of the smart playable device is operable to:
                receive sensor data from at least one of the first accelerometer, the second accelerometer, or the one or more magnetometers; and
                cause the wireless module to transmit an indication of the sensor data to a computing device in wireless communication with the wireless module during gameplay associated with the smart playable device.

2. The system as recited in claim 1, wherein the one or more electrical power supplies includes one or more removable batteries.

3. The system as recited in claim 1, the one or more processors of the smart playable device operable to:
receive a voltage of the one or more electrical power supplies via an analog-to-digital converter; and
cause the wireless module to transmit an indication of the voltage to the computing device in wireless communication with the wireless module.

4. The system as recited in claim 1, the smart playable device further including an air bladder, at least a portion of the air bladder surrounding the electronics assembly.

5. The system as recited in claim 1, the smart playable device further including one or more of a display or a light disposed on a surface of the smart playable device, the one or more of the display or the light configured to indicate an operational state associated with the smart playable device.

6. The system as recited in claim 1, wherein the smart playable device is a disc configured to fly.

7. The system as recited in claim 1, wherein the indication is a first indication, wherein the one or more magnetometers is configured to detect a presence of a magnetic field of an accessory device within a threshold distance to the smart playable device, and wherein the one or more processors of the smart playable device is further operable to:
cause the wireless module to transmit a second indication of presence of the magnetic field to the computing device in wireless communication with the wireless module during gameplay associated with the smart playable device.

8. The system as recited in claim 1, wherein:
the smart playable device is substantially symmetrical around a center of mass of the smart playable device;
the first accelerometer is mounted on the printed circuit board at a first distance from the center of mass; and
the second accelerometer is mounted on the printed circuit board at a second distance from the center of mass, the first distance different than the second distance.

9. The system as recited in claim 1, wherein the indication is a first indication, wherein the one or more components further comprise a barometer, and wherein the one or more processors of the smart playable device are further operable to:
receive barometer data from the barometer; and
cause the wireless module to transmit a second indication of the barometer data to the computing device in wireless communication with the wireless module during gameplay associated with the smart playable device.

10. A system comprising:
a smart playable device including:
an electronics assembly disposed in the smart playable device, the electronics assembly including at least one or more components mounted on a printed circuit board, the one or more components including:
one or more power supplies providing power to at least a portion of the one or more components;
one or more processors;
sensors including one or more accelerometers and a magnetometer; and
a wireless module;
the one or more processors configured to:
initialize in response to receiving the power from the one or more power supplies and cause the wireless module to initiate wireless communication with a computing device remote from the smart playable device;
receive a signal from the magnetometer indicative of the smart playable device being within a threshold distance from one or more accessory devices; and
provide an indication of the signal during gameplay to the computing device; and
the one or more accessory devices including:
one or more magnets detectable by the magnetometer of the smart playable device at a time in which the smart playable device is in proximity with the one or more accessory devices.

11. The system as recited in claim 10, wherein the electronics assembly is removably disposed in the smart playable device.

12. The system as recited in claim 10, wherein the one or more power supplies includes a removable battery.

13. The system as recited in claim 10, wherein the smart playable device includes one or more output components disposed on a surface of the smart playable device, wherein the one or more output components is configured to indicate a state of the smart playable device, the state based at least in part on data received from the computing device in wireless communication with the smart playable device.

14. The system as recited in claim 10, wherein the indication is a first indication, and wherein the one or more processors of the smart playable device are further configured to:
receive sensor data from the sensors; and
cause the wireless module to transmit a second indication of the sensor data to the computing device during gameplay associated with the smart playable device.

* * * * *